(12) United States Patent
Fujimura et al.

(10) Patent No.: US 8,549,311 B2
(45) Date of Patent: Oct. 1, 2013

(54) ELECTRONIC DEVICE, PASSWORD DELETION METHOD, AND PROGRAM

(75) Inventors: Kazuya Fujimura, Osaka (JP); Osamu Uchida, Kanagawa (JP); Yutaka Kobayashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 503 days.

(21) Appl. No.: 12/921,099

(22) PCT Filed: Dec. 9, 2008

(86) PCT No.: PCT/JP2008/003680
§ 371 (c)(1),
(2), (4) Date: Sep. 3, 2010

(87) PCT Pub. No.: WO2009/110044
PCT Pub. Date: Nov. 9, 2009

(65) Prior Publication Data
US 2011/0010517 A1    Jan. 13, 2011

(30) Foreign Application Priority Data
Mar. 5, 2008   (JP) ................................ 2008-055374

(51) Int. Cl.
G06F 21/00 (2013.01)
(52) U.S. Cl.
USPC .......................................... 713/182; 726/18
(58) Field of Classification Search
USPC .......................................... 726/18; 713/182
See application file for complete search history.

(56) References Cited

U.S. PATENT DOCUMENTS

| 5,282,247 | A | 1/1994 | McLean et al. |
| 6,044,470 | A | 3/2000 | Kuriyama |
| 6,108,791 | A * | 8/2000 | Lee et al. .................. 726/18 |
| 7,590,814 | B2 * | 9/2009 | Takao ....................... 711/164 |
| 2004/0005911 | A1 * | 1/2004 | Guirauton et al. ......... 455/558 |
| 2004/0054863 | A1 | 3/2004 | Harada et al. |
| 2004/0123127 | A1 * | 6/2004 | Teicher et al. ............. 713/193 |

(Continued)

FOREIGN PATENT DOCUMENTS

| EP | 1 376 592 A2 | 1/2004 |
| JP | 59-214946 A | 12/1984 |

(Continued)

OTHER PUBLICATIONS

"Persistent Client State HTTP Cookies," Netscape Communications Corporation, 1996, 4 pages.

(Continued)

*Primary Examiner* — Michael Pyzocha
(74) *Attorney, Agent, or Firm* — Seed IP Law Group PLLC

(57) ABSTRACT

An electronic device that can automatically unlock an external storage device with a password without adding a function to the external storage device is provided. An electronic device 100B has memory card connection means 108 for connecting a memory card 200 that can be locked with a password, password holding means 101 for holding card unique ID and a password, card unique ID acquisition means 104 for acquiring connection identification information indicating the card unique ID of the memory card 20 connected to the memory card connection means 108, and password deletion means 109 for deleting connection identification information and the password corresponding to the connection identification information stored in the password holding means 101 if the connection identification information is contained in the password holding means 101.

24 Claims, 27 Drawing Sheets

(56) References Cited

U.S. PATENT DOCUMENTS

| | | | |
|---|---|---|---|
| 2006/0253652 A1 | 11/2006 | Harada et al. | |
| 2007/0174618 A1* | 7/2007 | Nakano et al. | 713/171 |
| 2008/0215841 A1* | 9/2008 | Bolotin et al. | 711/164 |

FOREIGN PATENT DOCUMENTS

| | | |
|---|---|---|
| JP | 03-040165 A | 2/1991 |
| JP | 3688292 B2 | 6/1996 |
| JP | 1091533 A | 4/1998 |
| JP | 10334197 A | 12/1998 |
| JP | 33358777 B2 | 2/1999 |
| JP | 2004259208 A | 9/2004 |
| JP | 2007257218 A | 10/2007 |
| WO | 2009028052 A1 | 3/2009 |
| WO | 2009/110044 A1 | 9/2009 |

OTHER PUBLICATIONS

International Search Report relating to International Application No. PCT/JP2008/003680, mailed Mar. 17, 2009, 3 pages.

* cited by examiner

FIG.19

| CARD UNIQUE ID | PASSWORD | CHARACTER CODE |
|---|---|---|
| ID1 | PW1 | CODE1 |
| ID2 | PW2 | CODE2 |
| ... | ... | ... |
| IDn | PWn | CODEn |

SET PASSWORD IN MEMORY CARD.

SELECT ANY OUT OF THE FOLLOWING:

1. ENTER NEW PASSWORD

2. USE TERMINAL PERSONAL
   IDENTIFICATION NUMBER

3. USE PREVIOUSLY USED PASSWORD

4. AUTOMATICALLY GENERATE PASSWORD
   IN TERMINAL FOR USE

FIG.24

| PASSWORD SETTING |
|---|
| DO YOU STORE SETUP PASSWORD IN MAIN BODY? |

FIG.25

| PASSWORD SETTING |
|---|
| PASSWORD HAS BEEN<br><br>STORED IN MAIN BODY |

FIG.26

| PASSWORD DELETION IN MAIN BODY |
|---|
| DO YOU DELETE PASSWORD OF INSERTED SD, STORED IN MAIN BODY? |

FIG.27

PASSWORD CHARACTER CODE SELECTION

SELECT CHARACTER CODE
USED FOR PASSWORD

1. ASCII
2. UNICODE
3. S-JIS

ELECTRONIC DEVICE, PASSWORD DELETION METHOD, AND PROGRAM

TECHNICAL FIELD

The present invention relates to an electronic device, a password deletion method, and a program, and in particular to an electronic device to which an external storage medium that can be locked with a password is connected, a password deletion method of a password, and a program for unlocking a password.

BACKGROUND ART

Hitherto, various pieces of information can be carried easily using a memory card of an SD card, etc. The memory card is connected to an electronic device, whereby various pieces of information stored in the memory card can be input to the electronic device and can be processed in the electronic device.

In recent years, occasions in which personal information or secret information is stored in a memory card have increased with a larger capacity of the memory card. Awareness of the user using a memory card concerning security is raised and a memory card requiring the user to enter a password to reference information in the memory card also makes its appearance.

For example, a computer system having a memory card that can be re-inserted if it is removed, also has a function of protecting the stored data, and stores data is known. In the computer system, a password can be locked using a Lock_Unlock command.

However, in the computer system, to use a memory card protected with a password, whenever the memory card is connected to an electronic machine so that the memory card is inserted or whenever the memory card is again turned on, the password must be entered and the burden on the user grows.

As an example of a method of eliminating the need for entering a password each time, a method is known wherein when the user card number and its personal identification number are input to one transaction terminal in an amusement center, the information is stored in a central management apparatus and a different transaction terminal connected to the central processing apparatus can be used within a predetermined exemption time without entering the personal identification number (for example, refer to Patent Document 1).

A mechanism in which the provider of a Web site temporarily writes data into a computer of a visitor for storage through a Web browser is known. This is called Cookie system; information concerning the user, the date and time when the site was last visited, the number of visit times of the site, authentication information, and the like can be recorded in Cookie. Therefore, to use the mechanism for authentication of a memory card, a password needs to be entered only once when the memory card is first connected to an electronic card and later entry of the password becomes unnecessary.

Further, a program for causing a computer to store input information of ID, password, etc., input to an input screen in a database and automatically inputting the recorded input information each time when the input screen is opened is known (for example, refer to Patent Document 2).
Patent Document 1: JP-B-3335877
Patent Document 2: JP-A-2004-259208

DISCLOSURE OF THE INVENTION

Problems to be Solved by the Invention

However, in the methods in Patent Documents 1 and 2, for example, if the password set in a memory card is changed using an electronic device different from the electronic device that can be unlocked with the password, unlock with the password cannot be executed unless the changed password is entered. Therefore, if the user of the electronic device does not grasp the changed password, the user cannot unlock with the password.

In view of the circumstances described above, it is an object of the invention to provide an electronic device, a password deletion method, and a program capable of automatically unlocking an external storage device with a password if the password of the external storage device is changed in a different electronic device.

Means for Solving the Problems

In order to achieve the object, an electronic device according to a first aspect of the invention is configured by comprising: an external storage device connection section for connecting an external storage device that can be locked with a password; a password holding section that holds an identification number and a password of one or more external storage devices; an identification number acquisition section that is adapted to acquire connection identification information indicating the identification number of a connected external device indicating the external storage device connected to the external record device connection section; a password determination section that is adapted to determine whether or not the connection identification number is contained in the password holding section, and when the connection identification number is contained, determines whether or not the password of the connection external storage device matches a corresponding password indicating a password corresponding to the connection identification number held in the password holding section; and a password change section that is adapted to change at least the corresponding password held in the password holding section if the passwords do not match each other in the determination result.

According to this configuration, if the password of the external storage device is changed by a different electronic device, lock of the external storage device with the password can be released automatically.

An electronic device according to a second aspect of the invention is configured in that the case where the passwords do not match in the determination result is a case where the password of the connection external storage device is unset.

According to this configuration, if a password is unset as the password of the external storage device is deleted by a different electronic device, the password of the external storage device held in the electronic device is changed, whereby unlock can be performed.

An electronic device according to a third aspect of the invention is configured in that the case where the passwords do not match in the determination result is a case where the password of the connection external storage device differs from the corresponding password held in the password holding section.

According to this configuration, if the password of the external storage device is changed to another password by a different electronic device, the password of the external storage device held in the electronic device is changed, whereby unlock can be performed.

An electronic device according to a fourth aspect of the invention is configured in that change of the corresponding password is deletion of the connection identification information and the corresponding password stored in the password holding section.

According to this configuration, if the password of the external storage device is changed to another password by a different electronic device, the password of the external storage device held in the electronic device is deleted, whereby unlock can be performed.

An electronic device according to a fifth aspect of the invention is configured in that change of the password is transmission of a password setting signal for setting an input password input by an input section to the connection external storage device.

According to this configuration, if the password of the external storage device is changed to another password by a different electronic device, the external storage device is caused to again set the password of the external storage device held in the electronic device, whereby unlock can be performed.

An electronic device according to a sixth aspect of the invention is configured by further comprising a lock state determination section that is adapted to determine whether or not the connection external storage device is in a lock state, wherein if the lock state determination section determines that the connection external storage device is in an unlock state and if the connection identification information is contained in the password holding section, the password change section changes the connection identification information and the corresponding password stored in the password holding section.

According to this configuration, in the unlock state, for example, if the password of the external storage device is deleted by a different electronic device, password information of the external storage device held by the electronic device can be deleted and memory can be utilized effectively.

An electronic device according to a seventh aspect of the invention is configured by further comprising a lock state determination section that is adapted to determine whether or not the connection external storage device is in a lock state, wherein if the lock state determination section determines that the connection external storage device is in the lock state and if the connection identification information is contained in the password holding section, the password change section changes the connection identification information and the corresponding password stored in the password holding section.

According to this configuration, in the lock state, it is made possible to delete the password, whereby, for example, if the password of the external storage device is changed by a different electronic device, lock of the external storage device with the password can be released automatically.

An electronic device according to an eighth aspect of the invention is configured by further comprising a password setting section that is adapted to transmit a password setting signal for setting the corresponding password to the connection external storage device if the lock state determination section determines that the connection external storage device is in the unlock state and if the connection identification information is contained in the password holding section.

According to this configuration, for example, if the password of the external storage device is deleted by a different electronic device, a password can be again set in the external storage device based on password information of the external storage device held by the electronic device, and security of the external storage device improves.

An electronic device according to a ninth aspect of the invention is configured by further comprising a password setting section that is adapted to transmit a password setting signal for setting an input password input by an input section to the connection external storage device if the lock state determination section determines that the connection external storage device is in the unlock state and if the connection identification information is contained in the password holding section.

According to this configuration, for example, if the password of the external storage device is deleted by a different electronic device, the input password can be again set in the external storage device, and security of the external storage device improves.

An electronic device according to a tenth aspect of the invention is configured in that the password setting section stores the input password in the password holding section as the corresponding password.

According to this configuration, for example, if the password of the external storage device is deleted by a different electronic device, the password held by the electronic device used before the password of the external storage device is deleted is updated to the input password, whereby it is made possible to again automatically unlock.

An electronic device according to an eleventh aspect of the invention is configured by further comprising a password generation section for generating the password of the external storage device; a password selection section that is adapted to select any password of an input password input by an input section, a main body password to lock the function of the electronic device, the corresponding password, or a generated password generated by the password generation section, if the lock state determination section determines that the connection external storage device is in the unlock state and if the connection identification information is contained in the password holding section; and a password setting section that is adapted to transmit a password setting signal for setting the password selected by the password selection section.

According to this configuration, for example, if the password of the external storage device is not set because the password of the external storage device is deleted by a different electronic device, etc., any of the passwords mentioned above can be set in the external storage device, and security of the external storage device improves.

An electronic device according to a twelfth aspect of the invention is configured by further comprising an unlock section that is adapted to transmit an unlock signal for releasing the lock state of the connection external storage device based on an input password input by an input section if the lock state determination section determines that the connection external storage device is in the lock state and if the connection identification information is contained in the password holding section; and a password setting section that, if unlock ends in success after the unlock signal is transmitted, is adapted to store a success password indicating the input password corresponding to the unlock signal which has succeeded in the unlock in the password holding section as the corresponding password.

According to this configuration, for example, if the password of the external storage device is changed in a different electronic device and unlock is impossible with the password held by the electronic device, unlock can be performed with the input password and further the password of the connected external storage device held by the electronic device is updated with the input password, whereby if later the external storage device is again connected, unlock can be performed automatically.

An electronic device according to a thirteenth aspect of the invention is configured by further comprising an unlock section that is adapted to transmit an unlock signal for releasing the lock state of the connection external storage device based on an input password input by an input section if the lock state determination section determines that the connection external storage device is in the lock state and if the connection identification information is contained in the password holding section, wherein if unlock ends in failure after the unlock signal is transmitted, the password change section deletes the connection identification information and the corresponding password stored in the password holding section.

According to this configuration, for example, if the password of the external storage device is changed in a different electronic device and unlock is impossible with the password held by the electronic device and unlock is cannot be performed even with the input password, the password of the connected external storage device held by the electronic device is deleted, whereby the memory resources can be utilized effectively.

An electronic device according to a fourteenth aspect of the invention is configured by further comprising an unlock section that is adapted to transmit unlock signals in order, each signal for releasing the lock state of the connection external storage device based on the passwords held in the password holding section if the lock state determination section determines that the connection external storage device is in the lock state and if the connection identification information is contained in the password holding section; and a password setting section that, if unlock ends in success after the unlock signal is transmitted, is adapted to store a success password indicating the input password corresponding to the unlock signal which has succeeded in the unlock in the password holding section as the corresponding password.

According to this configuration, for example, if the password of the external storage device is changed in a different electronic device and unlock is impossible with the password held by the electronic device, unlock can be tried in order with the password held by any other electronic device than the connected external storage device and unlock can be performed automatically. Further, the password of the connected external storage device held by the electronic device is updated with the password wherein unlock ends in success, whereby if later the external storage device is again connected, unlock can be performed automatically.

An electronic device according to a fifteenth aspect of the invention is configured by further comprising an unlock section that is adapted to transmit unlock signals in order, each signal for releasing the lock state of the connection external storage device based on the passwords held in the password holding section if the lock state determination section determines that the connection external storage device is in the lock state and if the connection identification information is contained in the password holding section, wherein if unlock ends in failure after the unlock signals are transmitted, the password change section deletes the connection identification information and the corresponding password stored in the password holding section.

According to this configuration, for example, if the password of the external storage device is changed in a different electronic device and unlock is impossible with the password held by the electronic device and unlock cannot be performed even with the password of a different external storage device held by the electronic device, the password of the connected external storage device held by the electronic device is deleted, whereby the memory resources can be utilized effectively.

An electronic device according to a sixteenth aspect of the invention is configured by further comprising a selection section for selecting deletion or no deletion of the connection identification information and the corresponding password stored in the password holding section, wherein the password change section deletes the connection identification information and the corresponding password based on a selection result of the selection section.

According to this configuration, the password of the connected external storage device can be prevented from being deleted by mistake.

An electronic device according to a seventeenth aspect of the invention is configured by further comprising a selection section for selecting storage or no storage of the success password in the password holding section as the corresponding password, wherein the password setting section stores the success password in the password holding section as the corresponding password based on a selection result of the selection section.

According to this configuration, if the user does not need password holding, selection can be made so as not to hold a password and the memory resources can be utilized effectively.

An electronic device according to an eighteenth aspect of the invention is configured in that the selection section selects storage or no storage of the success password in the password holding section as the corresponding password for each piece of identification information of the external storage device held in the password holding section.

According to this configuration, selection can be made so as to hold only the password of the external storage device required by the user, the memory resources can be utilized effectively, and it is made possible to automatically unlock the external storage device corresponding to the held password.

An electronic device according to a nineteenth aspect of the invention is configured in that if the password is held in the password holding section as the corresponding password, the password setting section displays a message indicating the fact on the display section.

According to this configuration, the user can confirm that the password is held in the electronic device.

An electronic device according to a twentieth aspect of the invention is configured by further comprising a character code conversion section for converting a character code; and an unlock section which is adapted to transmit an unlock signal for releasing the lock state of the connection external storage device based on the corresponding password of the character code converted by the character code conversion section if the lock state determination section determines that the connection external storage device is in the lock state and if the connection identification information is contained in the password holding section.

According to this configuration, unless the character codes of the passwords as well as the passwords match, lock of the external storage device with the password is not released, security of the external storage device furthermore improves. For example, if the character code is changed in a different electronic device, automatic unlock is possible.

An electronic device according to a twenty-first aspect of the invention is configured by further comprising a password setting section that, if unlock ends in success after the unlock signal is transmitted, is adapted to store the password corresponding to the unlock signal which has succeeded in the unlock and store the character code of the password in the password holding section in association with the connection identification information.

According to this configuration, the identification information of the connected external storage device, the password, and the character code of the password are held in association with each other, whereby if later the external storage device is connected to the electronic device, it is made possible to automatically unlock.

An electronic device according to a twenty-second aspect of the invention is configured in that if the character code of the password corresponding to the connection identification information is held in the password holding section, the unlock section transmits the unlock signal based on the corresponding password of the character code.

According to this configuration, automatic unlock is possible with the password and the character code of the password included in the electronic device.

An electronic device according to a twenty-third aspect of the invention is configured by further comprising a character code specification section for specifying a character code, wherein the character code conversion section converts into character code specified by the character code specification section, and the unlock section transmits the unlock signal based on the corresponding password of the character code provided by the character code conversion section.

According to this configuration, if the electronic device does not include character code, the password can be specified by an input device, etc., and unlock is possible.

An electronic device according to a twenty-fourth aspect of the invention is configured by further comprising a character code list holding section that holds information of a plurality of character codes, wherein the unlock section transmits the unlock signals in order based on input passwords input by an input section, of the character codes held in the character code list holding section.

According to this configuration, if the electronic device does not hold the identification information of the connected external storage device, the password, or the character code in association with each other, the character code list is referenced, whereby it is made possible to automatically unlock.

A password deletion method according to a first aspect of the invention is a method, in an electronic device, comprising: a connection step of connecting an external storage device that can be locked with a password; a step of acquiring connection identification information indicating identification information of a connection external storage device indicating the external storage device connected in the connection step; and a step of, if the connection identification information is contained in a password holding section for holding the identification number and a password of the external storage device, deleting the connection identification information stored in the password holding section and deleting a corresponding password indicating a password corresponding to the connection identification information.

According to this method, if the password of the external storage device is changed in a different electronic device, lock of the external storage device with the password can be released automatically. The password of the connected external storage device can also be deleted.

A program according to a first aspect of the invention is a program for causing a computer to execute the steps of the password deletion method.

According to this program, if the password of the external storage device is changed in a different electronic device, lock of the external storage device with the password can be released automatically. The password of the connected external storage device can also be deleted.

Advantageous Effects of the Invention

According to the invention, there can be provided an electronic device, a password deletion method, and a program capable of automatically unlocking an external storage device with a password if the password of the external storage device is changed in a different electronic device.

BRIEF DESCRIPTION OF THE DRAWINGS

FIG. 19 shows an example of a password holding table in the fifth embodiment of the invention.

FIG. 23 shows a display example for selecting a password setting method in the third embodiment of the invention.

FIG. 24 shows a display example for checking whether or not to hold a password in a fourth embodiment of the invention.

FIG. 25 shows a display example to show a message indicating holding of the password in the fourth embodiment of the invention.

FIG. 26 shows a display example for confirming password deletion in the second embodiment of the invention.

FIG. 27 shows a display example for specifying character code in a fifth embodiment of the invention.

Figure 1:
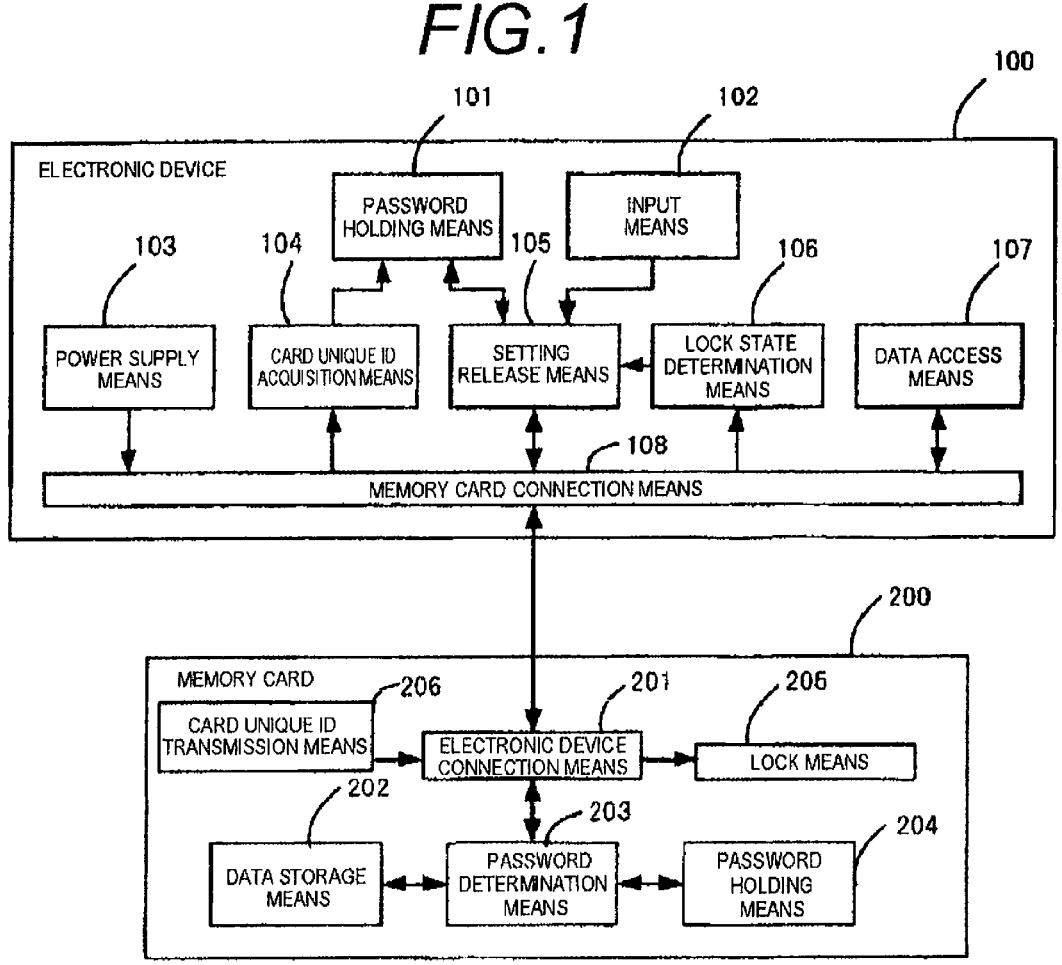
FIG. 1 shows an example of the schematic configuration of an electronic device in a first embodiment of the invention.

DESCRIPTION OF REFERENCE NUMERALS 100, 100B, 100C, 100D, 100E Electronic device
101, 101B Password holding means
102 Input means
103 Power supply means
104 Card unique ID acquisition means
105 Setting release means
106 Lock state determination means
107 Data access means
108 Memory card connection means
109 Password deletion means
110 Terminal personal identification number holding means
111 Password generation means
112 Password setting method selection means
113 Password holding selection means
114 Selection information holding means
115 Password holding display means
116 Character code conversion means
117 Character code list holding means
118 Character code specification means
200 Memory card
201 Electronic device connection means
202 Data storage means
203 Password determination means
204 Password holding means
205 Lock means
206 Card unique ID transmission means

BEST MODE FOR CARRYING OUT THE INVENTION

Electronic devices, password deletion methods, and programs in embodiments of the invention will be described below with the accompanying drawings.

First Embodiment

FIG. 1 shows an example of the schematic configuration of an electronic device 100 and a memory card 200 in a first embodiment of the invention.

The electronic device 100 has password holding means 101, input means 102, power supply means 103, card unique ID acquisition means 104, setting release means 105, lock state determination means 106, data access means 107, and memory card connection means 108.

As an electronic device in the embodiment of the invention, a PC, a PDA, a mobile telephone terminal, a TV, a digital still camera, a digital video camera, an IC recorder, a printer, an AV player, an AV recorder, HDD portable storage, a car navigation terminal, and any other electronic device to which an external storage device of a memory card, etc., can be considered.

The memory card connection means 108 is an example of "external storage device connection section." The setting release means 105 has functions as "unlock section" and "password setting section." The card unique ID acquisition means 104 has a function as "identification information acquisition section."

The memory card 200 has electronic device connection means 201, data storage means 202, password determination means 203, password holding means 204, lock means 205, and card unique ID transmission means 206.

Here, a memory card will be described as an example of external storage device, but storage devices of disk media of a hard disk, a DVD, etc., semiconductor memory devices of an SSD (Solid State Drive), USB memory, etc., for example, can be also considered as the external storage device.

As a memory card in the embodiment of the invention, an SD (Secure Digital) card, an MMC (Multi Media Card), a memory stick, an xD picture card, compact flash (registered trademark), smart media, and the like can be considered.

Figure 2:
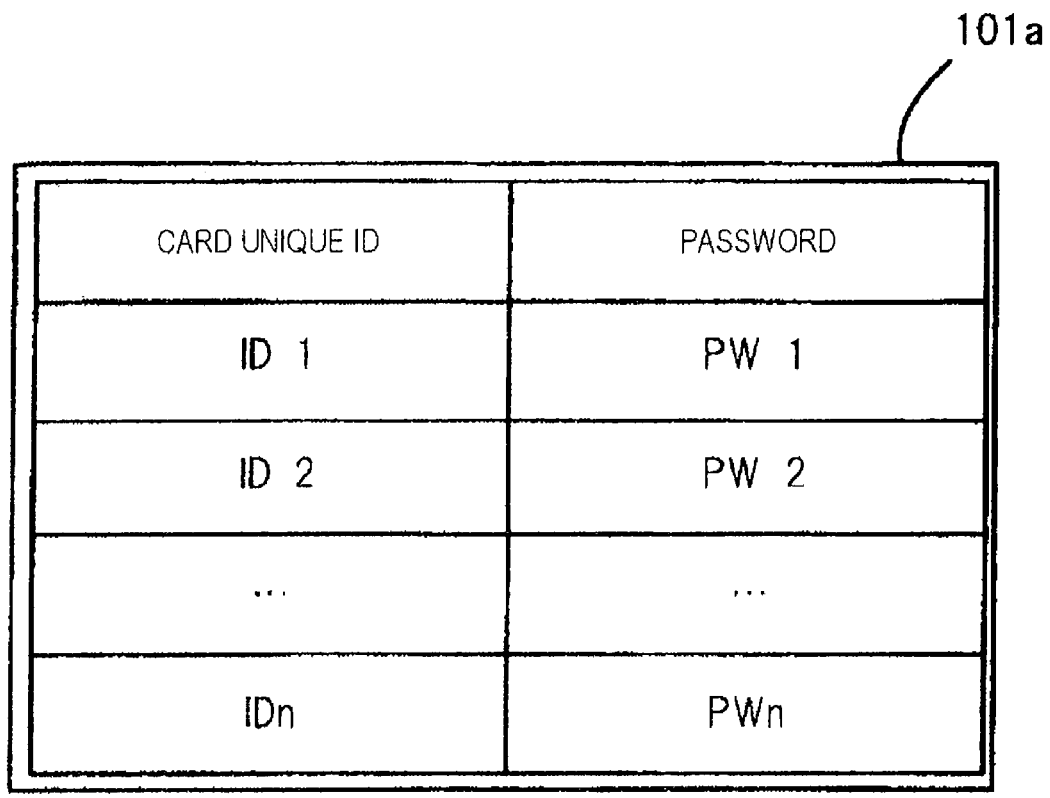
FIG. 2 shows an example of a password holding table in the first embodiment of the invention.

The password holding means 101 holds a password set by the setting release means 105. For example, the password holding means 101 has a password holding table 101a. The password holding table 101a holds the card unique ID for identifying the memory card 200 and the password of the card in association with each other (in a pair). FIG. 2 shows an example of the password holding table 101a.

As an example wherein the holding body of the password holding table 101a is changed, when a password is entered through the input means 102, for example, if the card unique ID of the memory card 200 connected to the electronic device 100 does not exist in the password holding table 101a, the card unique ID and the password are newly added to the password holding table 101a in association with each other (in a pair). When a password is entered through the input means 102, if the card unique ID of the memory card 200 connected to the electronic device 100 exists in the password holding table 101a, the password held in association with the card unique ID is updated to the entered password. If the password of the memory card 200 is deleted by the electronic device 100, the card unique ID and the password of the memory card 200 are deleted from the password holding table 101a.

The card unique ID is usually assigned for each memory card 200; alternatively, if the memory card 200 includes a plurality of partitions, for example, the card unique ID and the password can also be provided for each partition. In this case, it is also possible to provide one card unique ID and assign a different password for each partition. Accordingly, a lock state and an unlock state can be set for each partition.

Only the password may be held in the password holding table 101a without holding the card unique ID. In this case, the password associated with the card unique ID is not acquired and, for example, the passwords are referenced in the ascending order in the password holding table 101a and the password satisfying a predetermined condition is acquired.

The input means 102 is means for inputting text, an image, and a voice; for example, an input key, a camera, a microphone, etc., can be considered. The input means 102 inputs a password, etc.

The power supply means 103 supplies power to the memory card 200 through the memory card connection means 108.

The card unique ID acquisition means 104 acquires the card unique ID transmitted from the memory card 200 through the memory card connection means 108 and holds the card unique ID in the password holding means 101.

The setting release means 105 stores the password entered through the input means 102 in the password holding means 101. The setting release means 105 transmits a password setting signal for setting a password to the memory card 200 through the memory card connection means 108. The password setting signal contains the password from the input means 102 or the password holding means 101 and a control signal.

The setting release means 105 transmits an unlock signal for releasing the lock state of the memory card 200 to the memory card 200 through the memory card connection means 108. The unlock signal contains the password from the password holding means 101 or the input means 102 and a control signal.

The lock state determination means 106 determines whether or not the memory card 200 is locked with a password. For example, the lock state determination means 106 acquires a lock state signal from the memory card 200 through the memory card connection means 108 and determines whether or not the memory card 200 is locked. The lock state determination means 106 determines whether or not a password is set in the memory card 200.

The data access means 107 transmits an access signal for performing read processing, write processing, etc., for data stored in the data storage means 202 of the memory card 200 to the memory card 200 through the memory card connection means 108.

The memory card connection means 108 is means for connecting the memory card 200 and is, for example, a connection terminal. For example, the memory card 200 is inserted into a memory card slot, and the memory card connection means 108 is connected to the electronic device connection means 201 of the memory card 200, whereby data can be exchanged. The memory card connection means 108 has a function to detect that the memory card 200 is connected as it is inserted, etc.

The electronic device connection means 201 is means for connecting to the electronic device 100 and is, for example, a connection terminal. For example, the memory card 200 is inserted into a memory card slot and the memory card connection means 108 of the electronic device 100 is connected to the electronic device connection means 201, whereby data can be exchanged.

The data storage means 202 stores various pieces of data therein.

The password determination means 203 determines whether or not the password contained in the unlock signal and the password held in the password holding means 204 are the same. When the password determination means 203 acquires a password setting signal through the electronic device connection means 201, the password determination means 203 stores the password contained in the password setting signal in the password holding means 204.

The password holding means 204 holds the password of the memory card 200.

When power is supplied to the memory card 200, the lock means 205 locks the memory card 200 to prohibit access to the data storage means 202. If the password determination means 203 determines that the passwords to be determined are the same, the lock means 205 unlocks the memory card 200 to release the lock state.

When locking the memory card 200, the lock means 205 transmits a lock state signal indicating the lock state to the electronic device 100 through the electronic device connection means 201. When unlocking the memory card 200, the lock means 205 transmits an unlock completion signal indicating that unlock is complete to the electronic device 100 through the electronic device connection means 201. When unlock ends in failure, the lock means 205 may transmit an unlock error signal indicating failure of unlock to the electronic device 100 through the electronic device connection means 201.

The card unique ID transmission means 206 transmits the card unique ID to the electronic device 100 through the electronic device connection means 201.

Figure 3:
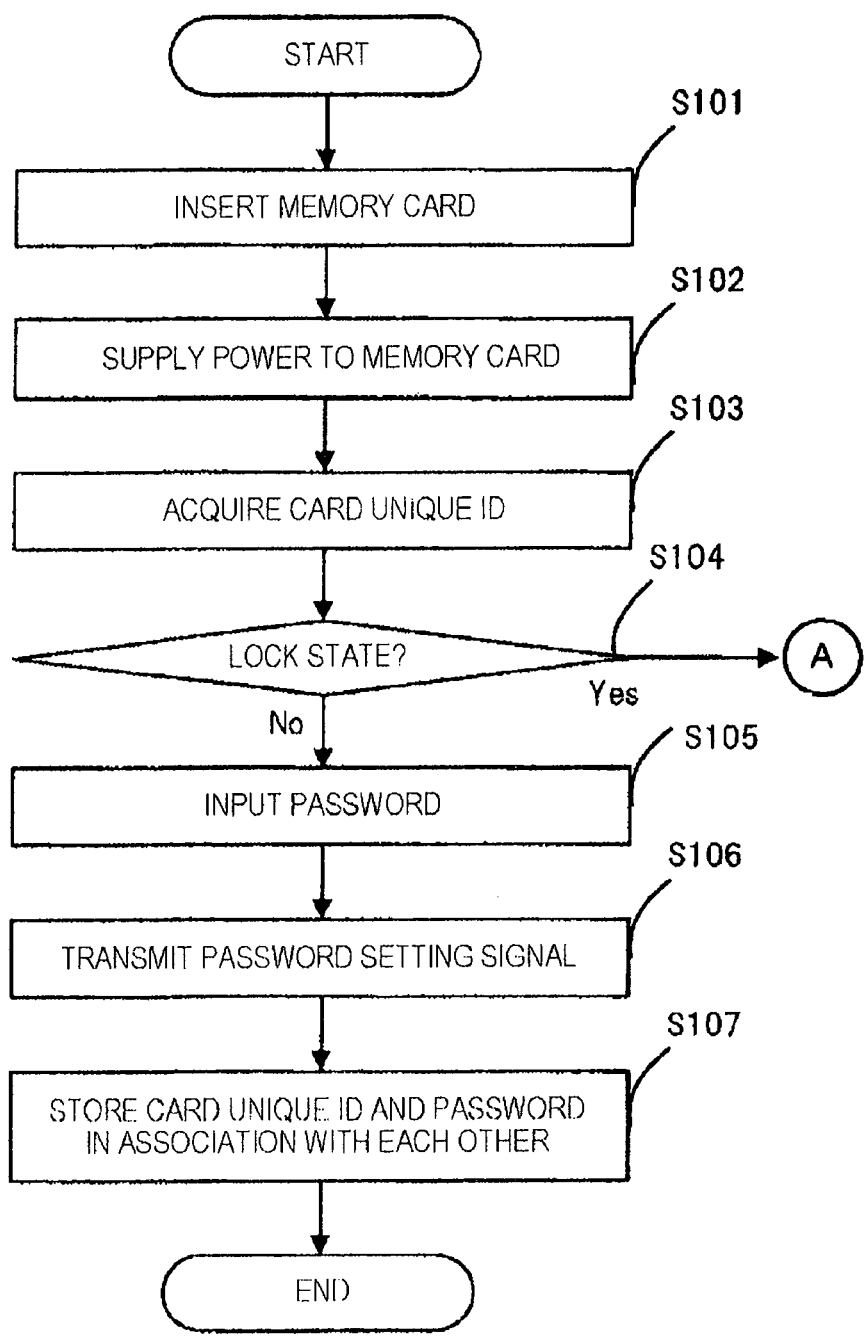
FIG. 3 is a flowchart to show an operation example of the electronic device in the first embodiment of the invention.
Figure 4:
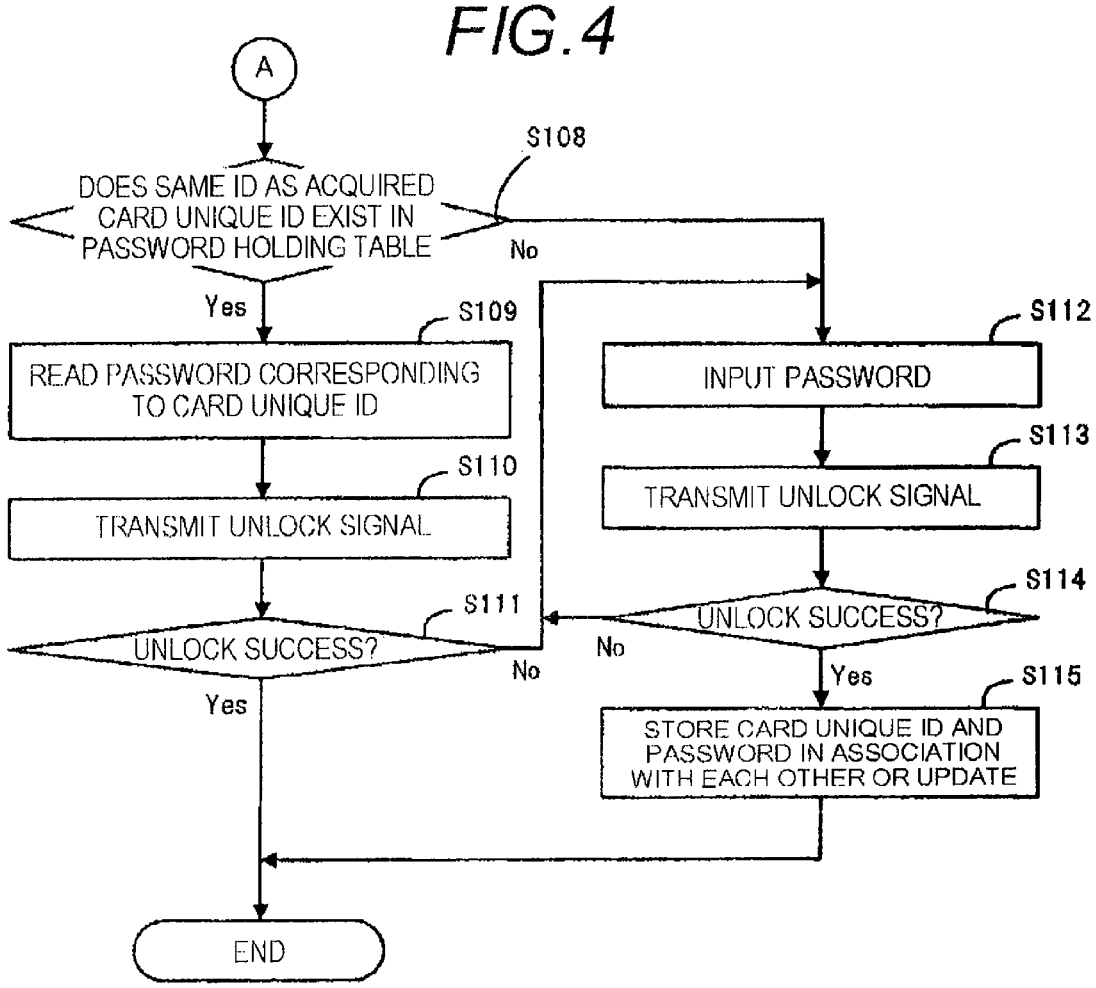
FIG. 4 is a flowchart to show an operation example of the electronic device in the first embodiment of the invention.

Next, an operation example of the electronic device 100 will be described. FIGS. 3 and 4 are flowcharts to show an operation example of the electronic device 100.

If the memory card connection means 108 detects that the memory card 200 is connected as it is inserted into a memory card slot, etc., (step S101), the power supply means 103 supplies power to the memory card 200 (step S102).

Subsequently, the card unique ID acquisition means 104 acquires the card unique ID from the memory card 200 (step S103).

Subsequently, the lock state determination means 106 determines whether or not the memory card 200 is in a lock state (step S104). In this determination, for example, the lock state determination means 106 acquires a lock state signal from the memory card 200 and determines whether or not the memory card 200 is in a lock state.

Steps S103 and S104 are in no particular order.

If it is determined that the memory card 200 is not in a lock state (is in an unlock state), the electronic device 100 can access the memory card 200. In this state, various settings can be made in the memory card 200 according to a command of the user. For example, when the user sets a password in the memory card 200, the user selects a setting mode for setting the password and the input means 102 inputs the password according to a command of the user (step S105).

Subsequently, to set the input password in the memory card 200, the setting release means 105 transmits a password setting signal (step S106).

Subsequently, the setting release means 105 stores the acquired card unique ID and the input password in the password holding means 101 in association with each other (step S107). Setting of the password is now complete.

If it is determined at step S104 that the memory card 200 is in a lock state, the setting release means 105 references the password holding table 101a held in the password holding means 101 and determines whether or not the same card unique ID as the acquired card unique ID exists (step S108).

If the same card unique ID exists, the setting release means 105 reads the password recorded in association with (in a pair with) the card unique ID from the password holding means 101 (step S109). For example, in FIG. 2, if the card unique ID is "ID1," password "PW1" is read.

Subsequently, the setting release means 105 transmits an unlock signal containing the read password (step S110).

Subsequently, the lock state determination means 106 determines whether or not unlock ends in success (step S111). In this determination, for example, if an unlock completion signal is detected within a predetermined time period since the unlock signal has been transmitted, it may be determined that unlock ends in success. If an unlock error signal is detected, it may be determined that unlock ends in failure.

If unlock ends in success, the unlock processing terminates. If unlock ends in failure, the process goes to step S112.

If the same card unique ID does not exist at step S108 or if unlock ends in failure at step S111, the input means 102 inputs the password according to a command of the user (step S112).

Subsequently, the setting release means 105 transmits an unlock signal containing the input password (step S113).

Subsequently, the lock state determination means 106 determines whether or not unlock ends in success (step S114). If unlock ends in failure, the process returns to step S112.

If unlock ends in success, the setting release means 105 stores the acquired card unique ID and the input password in the password holding means 101 in association with each other (in a pair) (step 115). If the password is already stored, it is updated to the entered password. The processing of unlock and password setting is now complete.

If the lock state is released, the data access means 107 can access various pieces of data stored in the data storage means 202 and can read processing, write processing, etc.

According to the electronic device 100, lock of the memory card 200 with the password can be automatically released without adding a function to the memory card 200. If the memory card 200 is removed and inserted, the memory card 200 is unlocked without repeatedly entering the password by the user, so that convenience is enhanced.

For example, if the memory card 200 wherein setting of the password and unlock once end in success in the electronic device 100 is connected, the card unique ID and the password of the memory card 200 are recorded in the password holding means 101 of the electronic device 100 in association with each other. Thus, an unlock signal is automatically generated from the recorded information and is transmitted to the memory card 200. In the memory card 200, the password is taken out from the unlock signal and is compared with the password held in the password holding means 204. If they match, unlock can be automatically performed.

As the case where the passwords do not match, it is considered that the memory card is once connected to the electronic device 100 and the card unique ID and the password are recorded in the password holding means 101 and then the password is changed by a different electronic device. In this case, the passwords differ from each other. If the password is once set and then is changed, the changed password is entered by key operation, etc., whereby unlock can be performed. In this case, unlock is performed and the password before changed is updated as the entered password corresponding to the card unique ID. Therefore, at the later connection of the memory card 200, unlock can be automatically performed without entering the password. If a password is not set (unset), the passwords do not match.

If the memory card 200 is first connected to the electronic device 100, the card unique ID and the password of the memory card 200 are not recorded in the password holding means 101 and thus the password is entered by key operation, etc., whereby unlock can be performed. In this case, unlock is performed and the card unique ID and the entered password are stored in the password holding means 101 in association with each other. Therefore, at the later connection of the memory card 200, unlock can be automatically performed without entering the password.

Further, if the memory card 200 is connected to the electronic device 100 and power is supplied to the memory card 200, when a lock state of the memory card 200 is not detected, it is considered that no password is set in the memory card 200. In this case, a password is entered by key operation, etc., the password can be set. When the password is set, the card unique ID and the entered password are stored in the password holding means 101 in association with each other. Therefore, at the later connection of the memory card 200, when power is supplied, lock is automatically performed and unlock can be automatically performed without entering the password.

If an external storage device having no card unique ID such as a hard disk rather than the memory card 200 is connected to the electronic device 100, for example, an unlock signal containing a password held in the password holding table 101*a* may be transmitted, the table may be searched for the password in order and an unlock signal may be generated until unlock ends in success, and the unlock signal may be continuously transmitted until the unlock signal is received. Accordingly, if an external storage device having no card unique ID is connected to the electronic device 100, unlock can be automatically performed.

As methods of determining presence/absence of password setting in the memory card 200 and whether or not the memory card 200 is locked, for example, the following methods are available:

The fact that a password is already set and the memory card 200 is locked (LOCK state) can be recognized from the fact that the memory card 200 becomes a lock state automatically after power is supplied to the memory card 200, for example. For example, if the determination result at step S104 in FIG. 3 is "Yes," a password is already set and the memory card 200 is locked.

The fact that a password is already set and the memory card 200 is unlocked (UNLOCK state) is can be recognized from the fact that the memory card 200 becomes a lock state automatically after power is supplied to the memory card 200 and then unlock ends in success by an unlock signal, for example. For example, if the determination result at step S111 in FIG. 3 is "Yes" or the determination result at step S114 is "Yes," a password is already set and the memory card 200 is unlocked.

The fact that a password is unset (unset state) can be recognized from the fact that the memory card 200 does not automatically become a lock state after power is supplied to the memory card 200, for example. For example, if the determination result at step S104 in FIG. 3 is "No," a password is unset.

Second Embodiment

Figure 5:
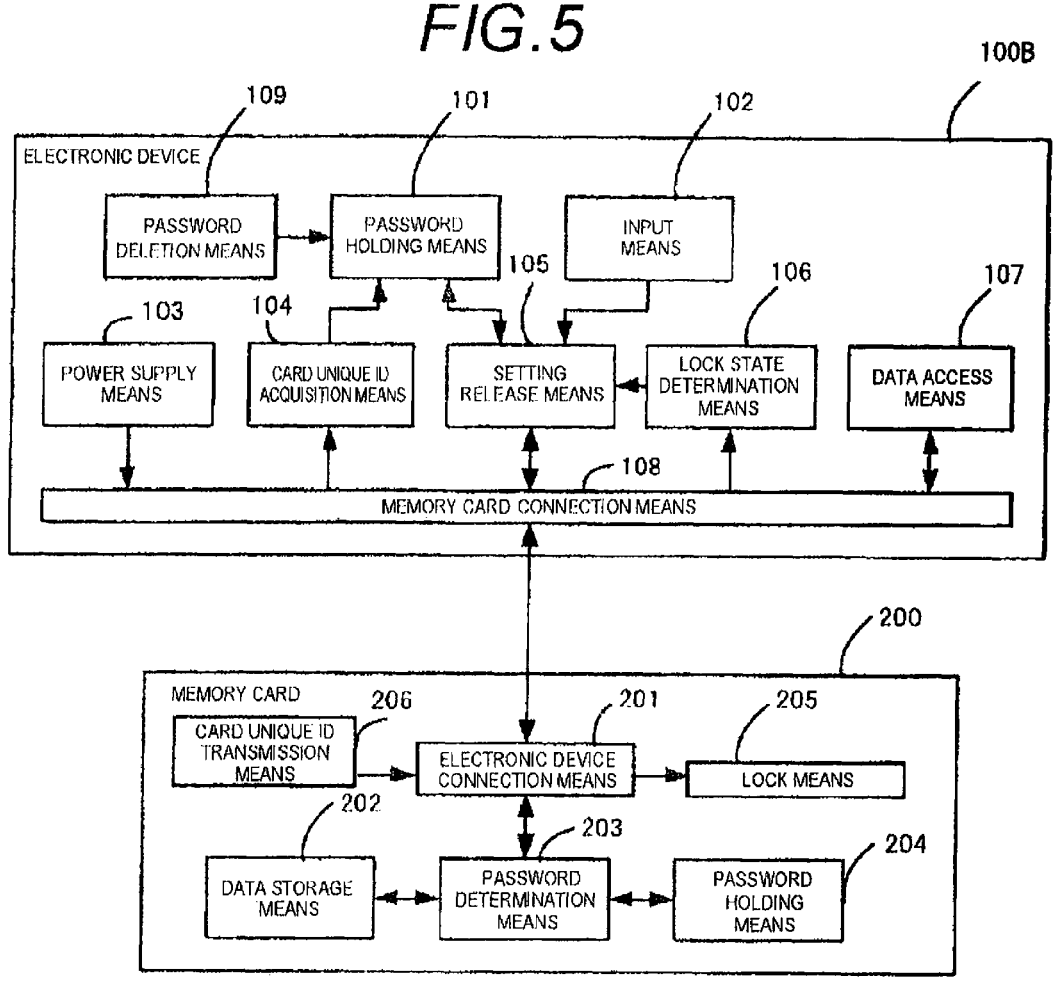
FIG. 5 shows an example of the schematic configuration of an electronic device in a second embodiment of the invention.

FIG. 5 shows an example of the schematic configuration of an electronic device 100B and a memory card 200 in a second embodiment of the invention. Components of the electronic device 100B and the memory card 200 identical with those of the electronic device 100 and the memory card 200 shown in FIG. 1 are denoted by the same reference numerals and will not be described again or will be briefly described.

The electronic device 100B has password deletion means 109 in addition to the components of the electronic device 100.

The password deletion means 109 deletes the card unique ID to be deleted and the password (namely, corresponding password) associated with the card unique ID in information held in password holding means 101.

Figure 6:
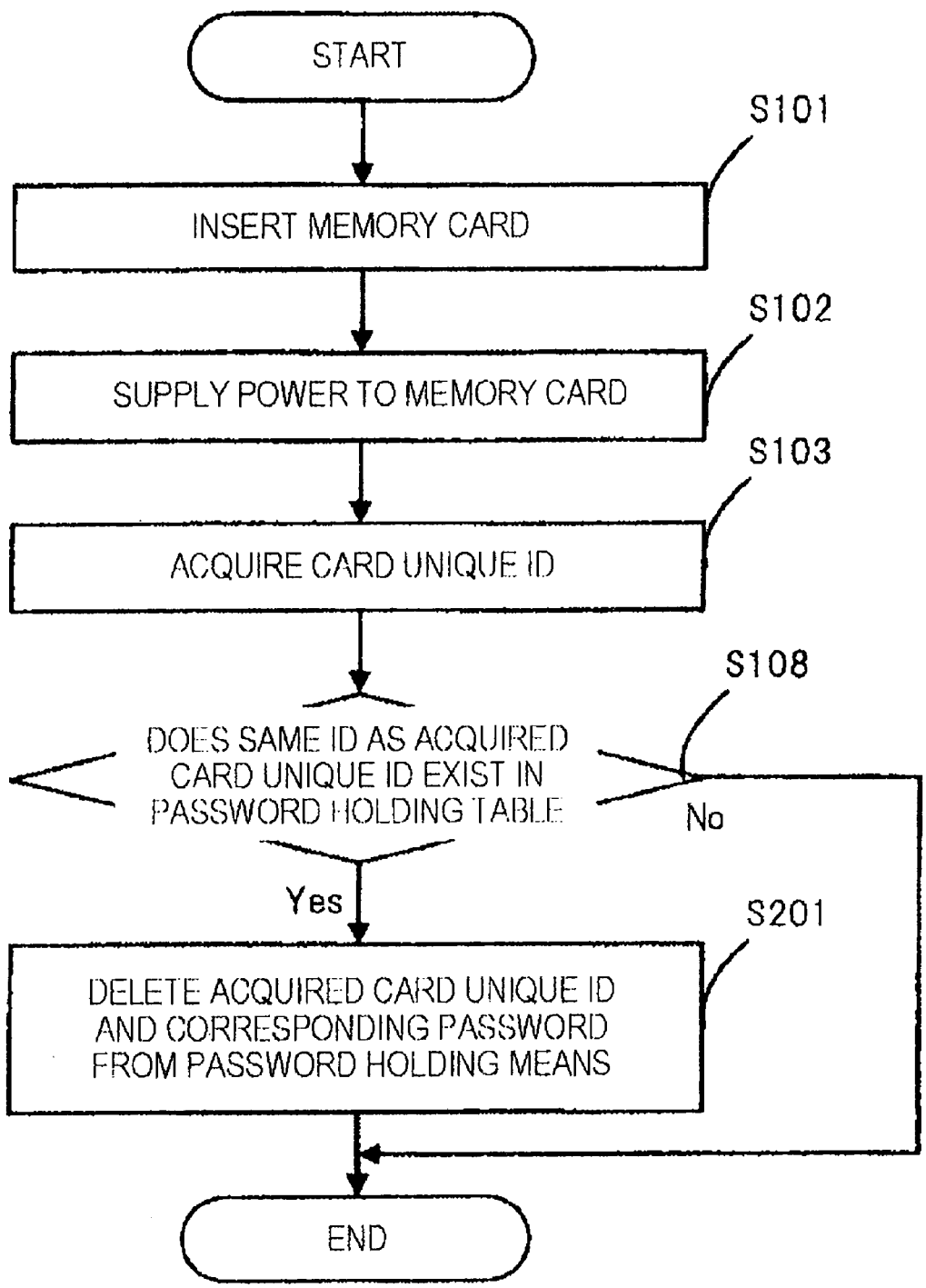
FIG. 6 is a flowchart to show an operation example of the electronic device in the second embodiment of the invention.

Next, an operation example of the electronic device 100B will be described. FIG. 6 is a flowchart to show an operation example of the electronic device 100B. Steps identical with those in FIGS. 3 and 4 are denoted by the same step numbers and will not be described again or will be briefly described.

First, the electronic device 100B performs steps S101 to S103 and S108 in FIGS. 3 and 4.

If it is determined at step S108 that the same ID as the acquired card unique ID exists in the password holding means 101, the password deletion means 109 deletes the acquired card unique ID and the password (namely, corresponding password) associated with the acquired card unique ID from the password holding means 101 (step S201).

Just before step S201, display means not shown in FIG. 5 displays a message to confirm deletion of the password as in FIG. 26, for example. Selection means for password deletion (not shown) may enable the user to select password deletion or no password deletion with reference to the confirmation display. Similarity also applies to step S201 described later.

According to the electronic device 100B for performing the processing in FIG. 6, for example, if the memory card 200 with the password deleted by any device other than the electronic device 100B is connected to the electronic device 100B, the later unusable password is deleted, whereby the memory resources can be utilized effectively. Whether or not lock of the memory card 200 with the password is released can be determined between steps S103 and S108, but the acquired card unique ID and the corresponding password can be deleted regardless of whether or not lock is released.

Figure 7:
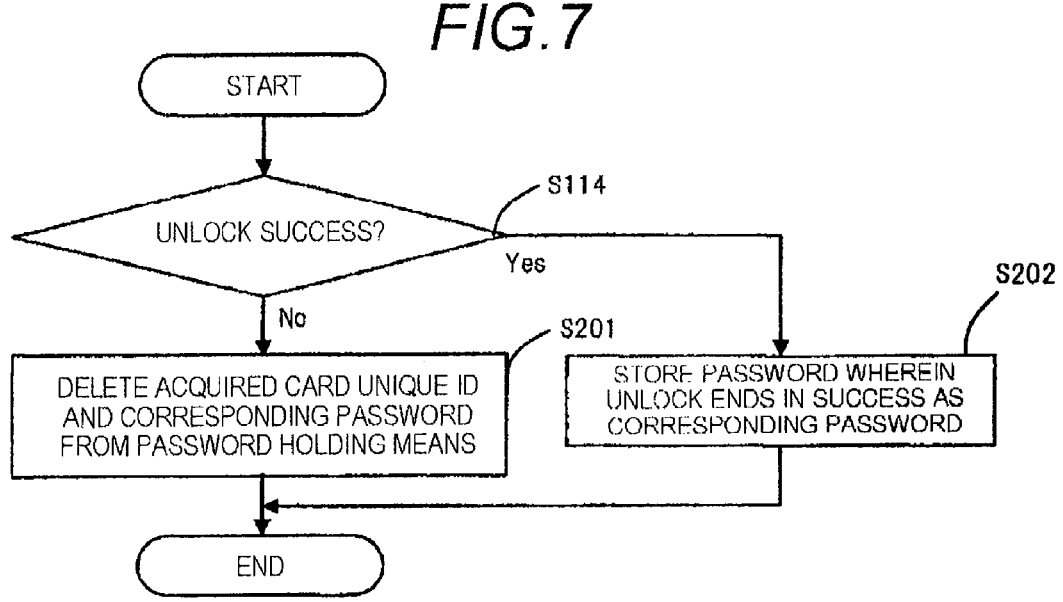
FIG. 7 is a flowchart to show another operation example of the electronic device in the second embodiment of the invention.

Next, another operation example of the electronic device 100B will be described. FIG. 7 is a flowchart to show another operation example of the electronic device 100B.

The processing in FIG. 7 basically is similar to the processing in FIGS. 3 and 4; however, they differ in processing after step S114. Here, steps S101 to S113 are not shown in the figure and will not be described again and only the processing on and after step S114 is shown in the figure and will be described.

If unlock ends in failure at step S114, the password deletion means 109 deletes the acquired card unique ID and the password (corresponding password) associated with the acquired card unique ID from the password holding means 101 (step S201).

If unlock ends in success at step S114, setting release means 105 stores the password wherein unlock ends in success in the password holding means 101 as the password (corresponding password) associated with the acquired card unique ID (step S202).

According to the electronic device 100B for performing the processing in FIG. 7, for example, if the memory card 200 with the password changed in any device other than the electronic device 100B is connected to the electronic device 100B, when unlock ends in failure, the later unusable password is deleted, whereby the memory resources can be utilized effectively. If unlock ends in success, the password wherein unlock ends in success is held, whereby it is made possible to automatically perform the later unlock.

Although not shown in the figure, password input at step S112 may be performed without performing the first unlock determination processing at steps S108 to S111 in FIG. 4.

Figure 8:
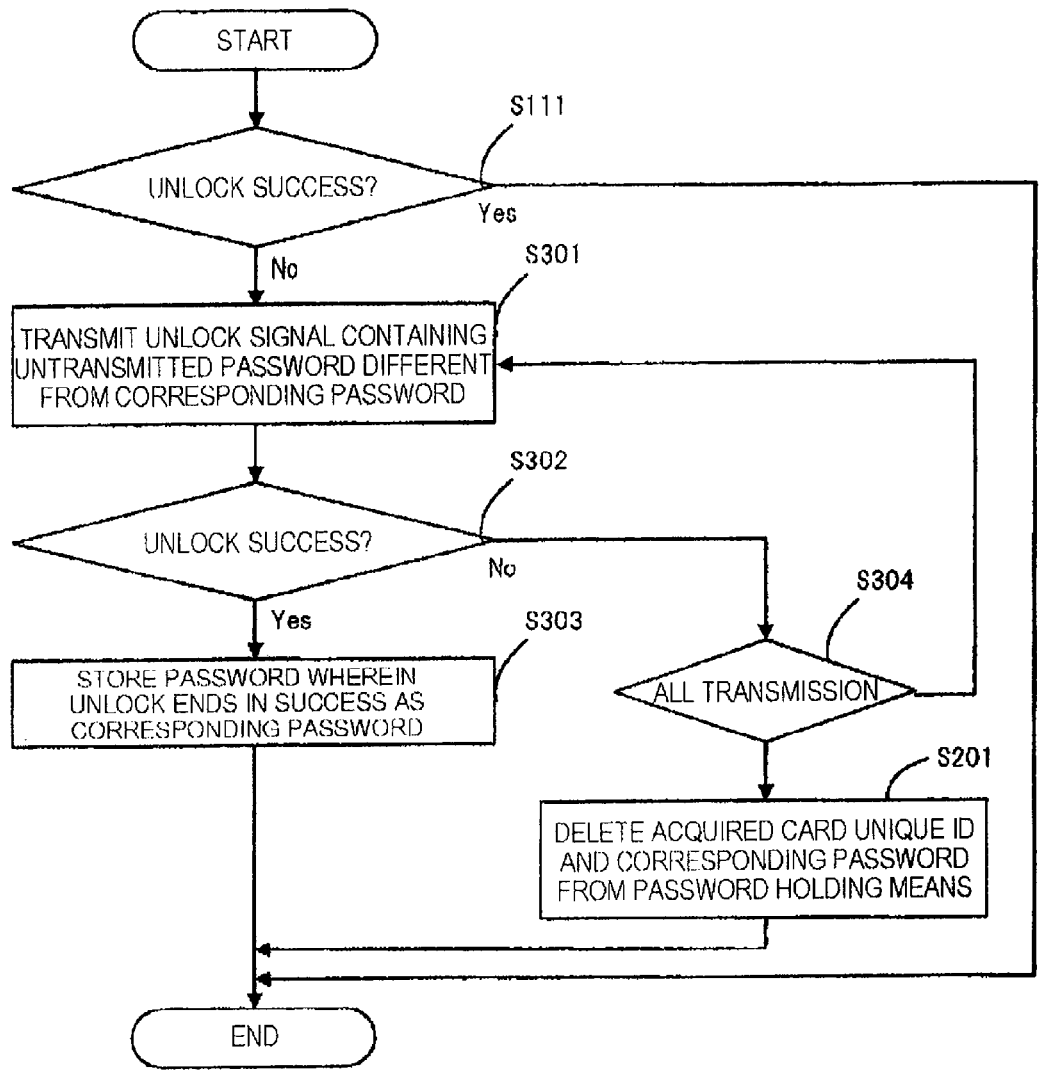
FIG. 8 is a flowchart to show a still another operation example of the electronic device in the second embodiment of the invention.

Next, still another operation example of the electronic device 100B will be described. FIG. 8 is a flowchart to show still another operation example of the electronic device 100B.

The processing in FIG. 8 is basically similar to the processing in FIGS. 3 and 4; however, they differ in processing after step S111. Here, steps S101 to S110 are not shown in the figure and will not be described again and only the processing on and after step S111 is shown in the figure and will be described.

If unlock ends in failure at step S111, the setting release means 105 transmits an unlock signal containing an untransmitted password of passwords different from the password (corresponding password) held in the password holding means 101 and associated with the acquired card unique ID (step S301).

Subsequently, lock state determination means 106 determines whether or not unlock ends in success (step S302).

If unlock ends in success, the setting release means 105 stores the password wherein unlock ends in success in the password holding means 101 as the password (corresponding password) associated with the acquired card unique ID (step S303).

If unlock ends in failure, the setting release means 105 determines whether or not an unlock signal is transmitted for all passwords held in the password holding means 101 (step S304). If a password for which transmission of unlock signal is not complete remains in the password holding means 101, the process returns to step S301.

Upon completion of transmission of the unlock signal for all passwords, the password deletion means 109 deletes the acquired card unique ID and the password (corresponding password) associated with the acquired card unique ID from the password holding means 101 (step S201).

According to the electronic device 100B for performing the processing in FIG. 8, the memory card 200 with the password changed in any device other than the electronic device 100B is connected to the electronic device 100B, a search is made for the password held in the password holding means 101 and it is possible to try to unlock with the password of the memory card 200 with a different unlock signal in order. If unlock cannot be performed for all passwords held in the password holding means 101, the later unusable password can be deleted, so that the memory resources can be utilized effectively.

Third Embodiment

Figure 9:
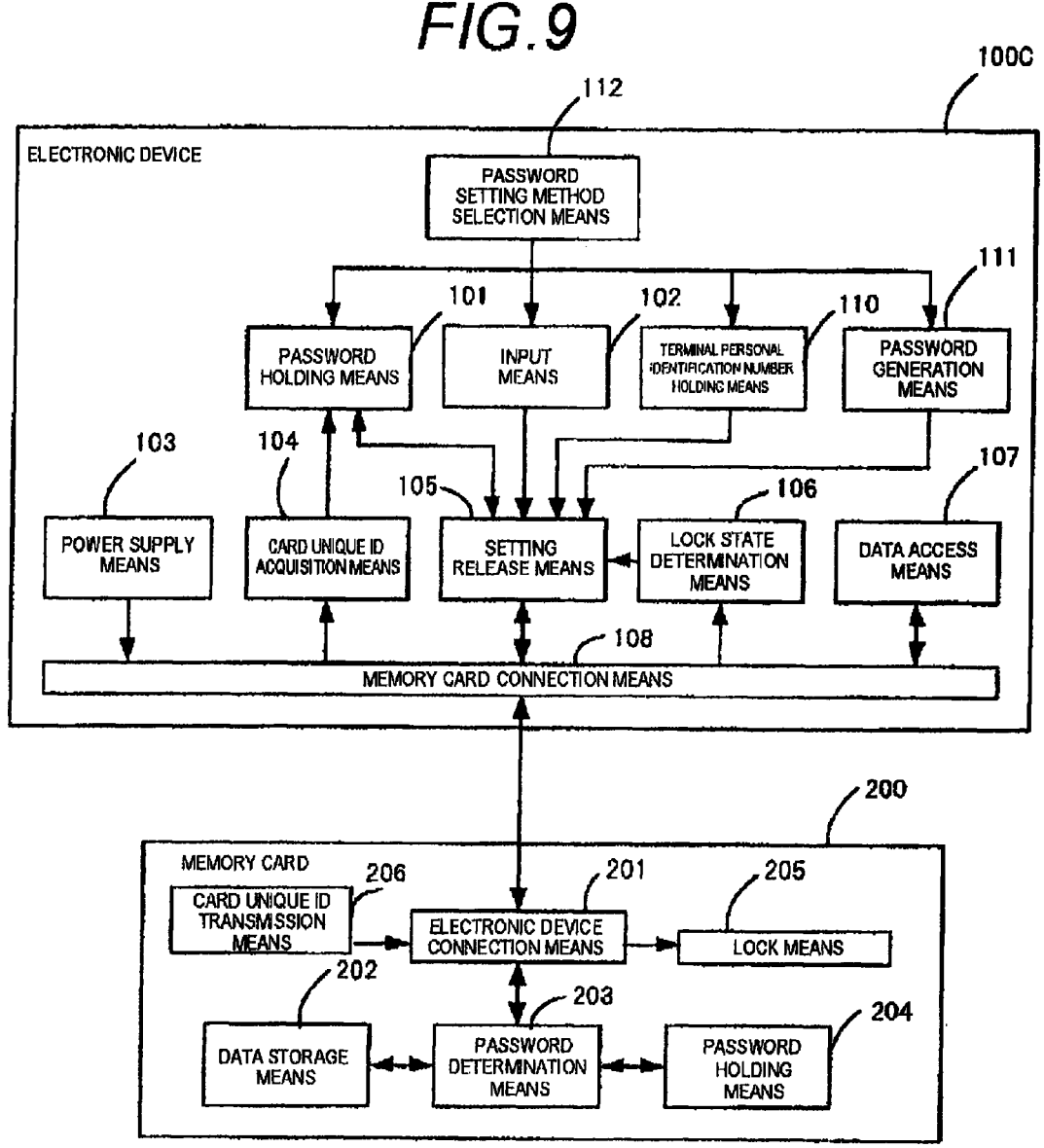
FIG. 9 shows an example of the schematic configuration of an electronic device in a third embodiment of the invention.

FIG. 9 shows an example of the schematic configuration of an electronic device 100C and a memory card 200 in a third embodiment of the invention. Components of the electronic device 100C and the memory card 200 identical with those of the electronic device 100 and the memory card 200 shown in FIG. 1 are denoted by the same reference numerals and will not be described again or will be briefly described.

The electronic device 100C has terminal personal identification number holding means 110, password generation means 111, and password setting method selection means 112 in addition to the components of the electronic device 100.

The terminal personal identification number holding means 110 holds the personal identification number and identification information (main body password) to lock the function of the electronic device 100C.

The password generation means 111 generates a password (generated password) to set in the memory card 200. As a password generation method, for example, conversion or encryption may be performed based on the card unique ID of the memory card 200 to generate a password, conversion or encryption may be performed based on the device unique ID for identifying the electronic device 100C to generate a password, conversion or encryption may be performed based on both the card unique ID and the device unique ID to generate a password, or a random value or the time may be used to generate a password based on neither the card unique ID nor the device unique ID.

The password setting method selection means 112 selects a method to set a password of the memory card 200. For example, selection is made as to which of the password (input password) input to input means 102, the password held in password holding means 101, the main body password, and generated password, the password of the memory card 200 is set based on. A password can also be set using any method described above as a predetermined setting method without using the password setting method selection means 112. The password setting method selection means 112 has a function as "password selection section."

Figure 10:
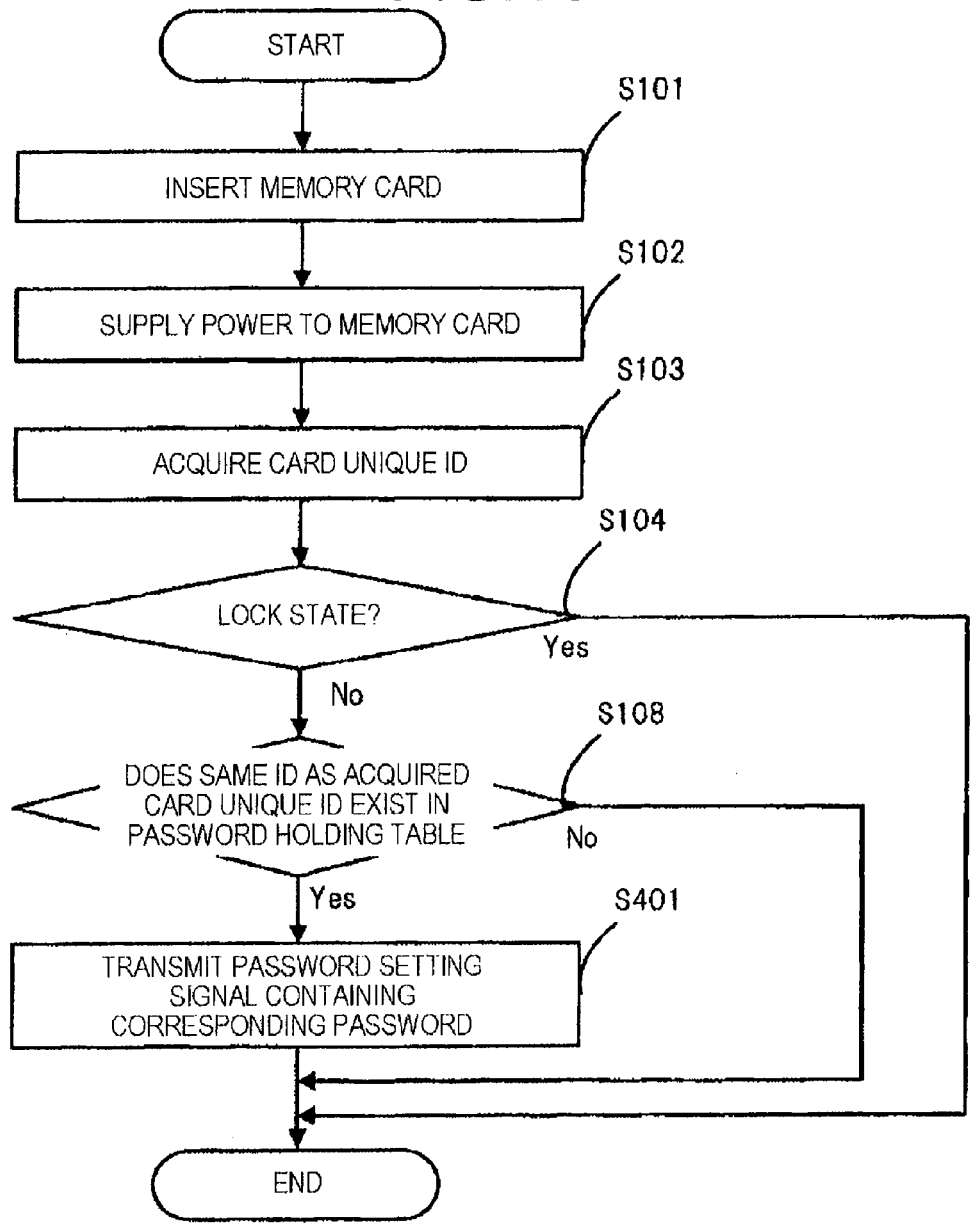
FIG. 10 is a flowchart to show an operation example of the electronic device in the third embodiment of the invention.

Next, an operation example of the electronic device 100C will be described. FIG. 10 is a flowchart to show an operation example of the electronic device 100C. Steps identical with those in FIGS. 3 and 4 are denoted by the same step numbers and will not be described again or will be briefly described.

First, the electronic device 100C performs steps S101 to S104 in FIG. 3. Steps S103 and S104 are not in particular order.

If it is determined at step S104 that the memory card 200 is not in a lock state, the electronic device 100C performs step S108 in FIG. 4. When step S104 is executed preceding step S103, if it is determined at step S104 that the memory card 200 is not in a lock state, the card unique ID is acquired.

If it is determined at step S108 that the same ID as the acquired card unique ID exists in the password holding means 101, setting release means 105 transmits a password setting signal containing the password (corresponding password) held in association with the acquired card unique ID in the password holding means 101 (step S401).

According to the electronic device 100C for performing the processing in FIG. 10, for example, if the memory card 200 with the password deleted by any device other than the electronic device 100C is connected to the electronic device 100C, security of the memory card 200 can be enhanced. Since the held password of the electronic device 100C previously set in the memory card 200 is used as the password, the password can be set automatically and easily.

Figure 11:
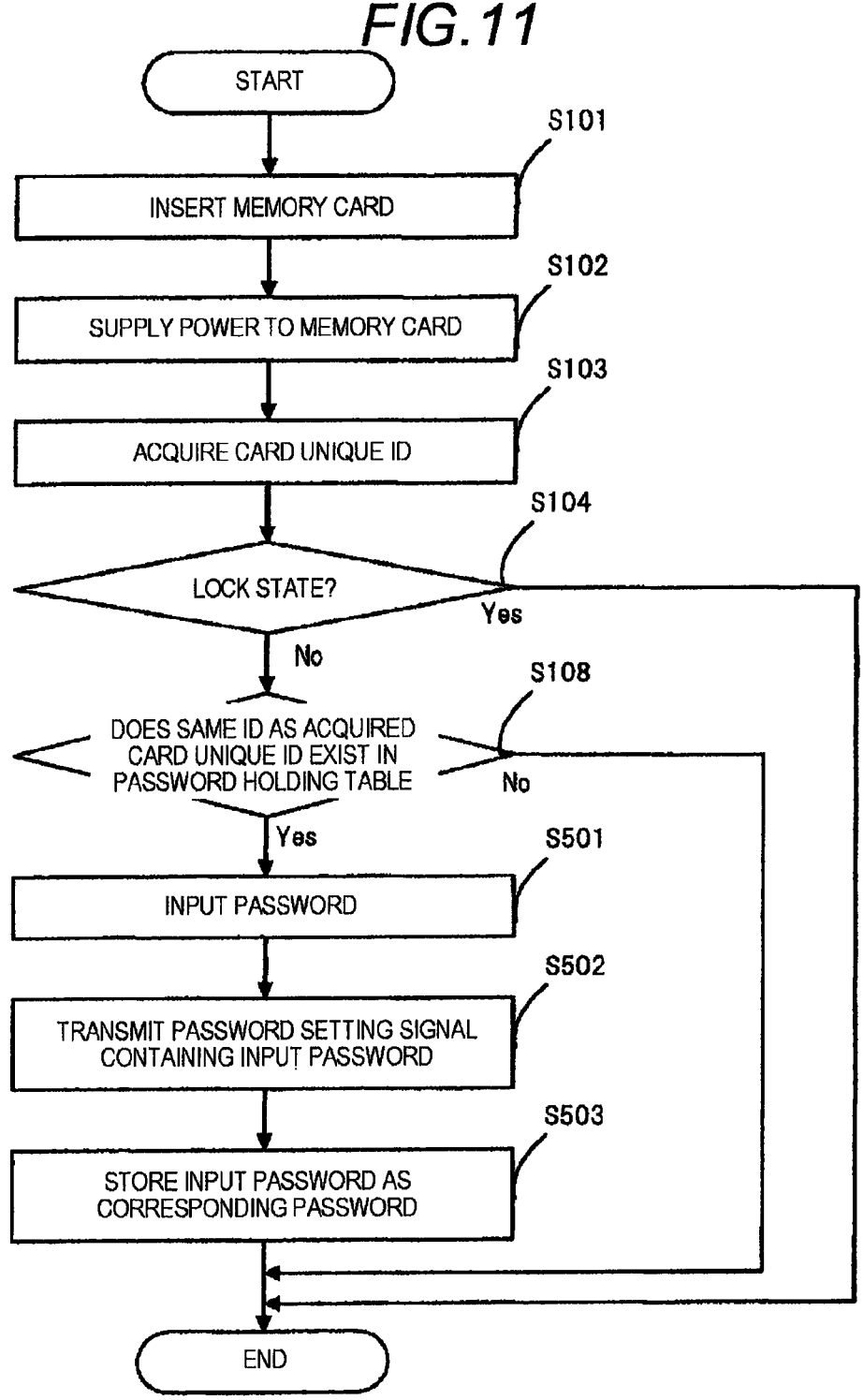
FIG. 11 is a flowchart to show another operation example of the electronic device in the third embodiment of the invention.

Next, another operation example of the electronic device 100C will be described. FIG. 11 is a flowchart to show another operation example of the electronic device 100C. Steps identical with those in FIGS. 3 and 4 are denoted by the same step numbers and will not be described again or will be briefly described.

First, the electronic device 100C performs steps S101 to S104 in FIG. 3. Steps S103 and S104 are in no particular order.

If it is determined at step S104 that the memory card 200 is not in a lock state, the electronic device 100C performs step S108 in FIG. 4. When step S104 is executed preceding step S103, if it is determined at step S104 that the memory card 200 is not in a lock state, the card unique ID is acquired.

If it is determined at step S108 that the same ID as the acquired card unique ID exists in the password holding means 101, the input means 102 inputs a password according to a command of the user (step S501).

Subsequently, the setting release means 105 transmits a password setting signal containing the password (input password) input to the input means 102 (step S502).

Subsequently, the setting release means 105 stores the input password in the password holding means 101 as the password (corresponding password) associated with the acquired card unique ID (step S503).

According to the electronic device 100C for performing the processing in FIG. 11, for example, if the memory card 200 with the password deleted by any device other than the electronic device 100C is connected to the electronic device 100C, security of the memory card 200 can be enhanced. Since the input password is used as the password, the password desired by the user can be set.

Figure 12:
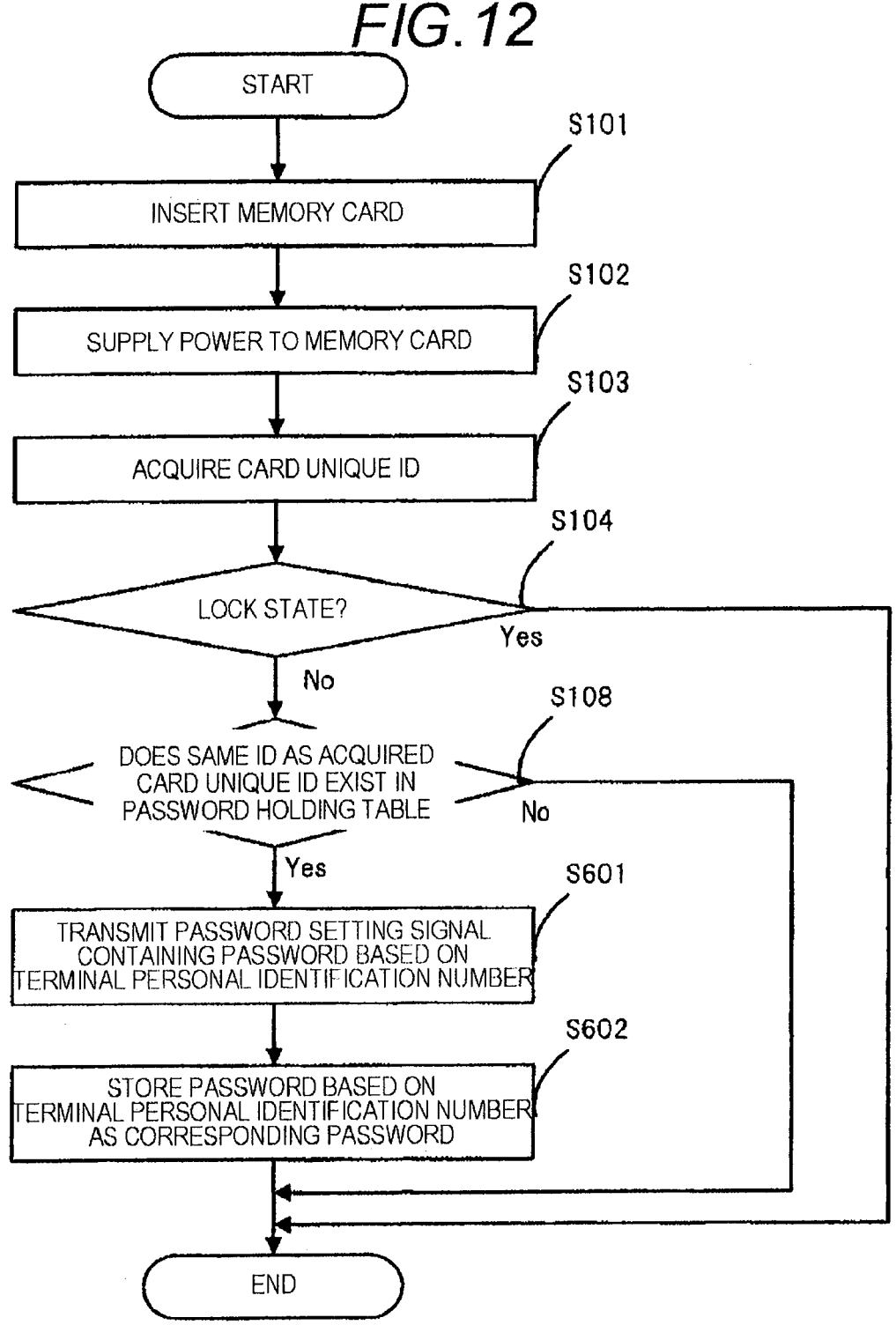
FIG. 12 is a flowchart to show a still another operation example of the electronic device in the third embodiment of the invention.

Next, still another operation example of the electronic device 100C will be described. FIG. 12 is a flowchart to show still another operation example of the electronic device 100C. Steps identical with those in FIGS. 3 and 4 are denoted by the same step numbers and will not be described again or will be briefly described.

First, the electronic device 100C performs steps S101 to S104 in FIG. 3. Steps S103 and S104 are not in particular order.

If it is determined at step S104 that the memory card 200 is not in a lock state, the electronic device 100C performs step S108 in FIG. 4. When step S104 is executed preceding step S103, if it is determined at step S104 that the memory card 200 is not in a lock state, the card unique ID is acquired.

If it is determined at step S108 that the same ID as the acquired card unique ID exists in the password holding means 101, the setting release means 105 transmits a password setting signal containing the password based on the terminal personal identification number held in the terminal personal identification number holding means 110 (step S601).

Subsequently, the setting release means 105 stores the password based on the terminal personal identification number in the password holding means 101 as the password associated with the acquired card unique ID (step S602).

According to the electronic device 100C for performing the processing in FIG. 12, for example, if the memory card 200 with the password deleted by any device other than the electronic device 100C is connected to the electronic device 100C, security of the memory card 200 can be enhanced. Since the password is based on the terminal personal identification number, the password can be set automatically and easily.

Figure 13:
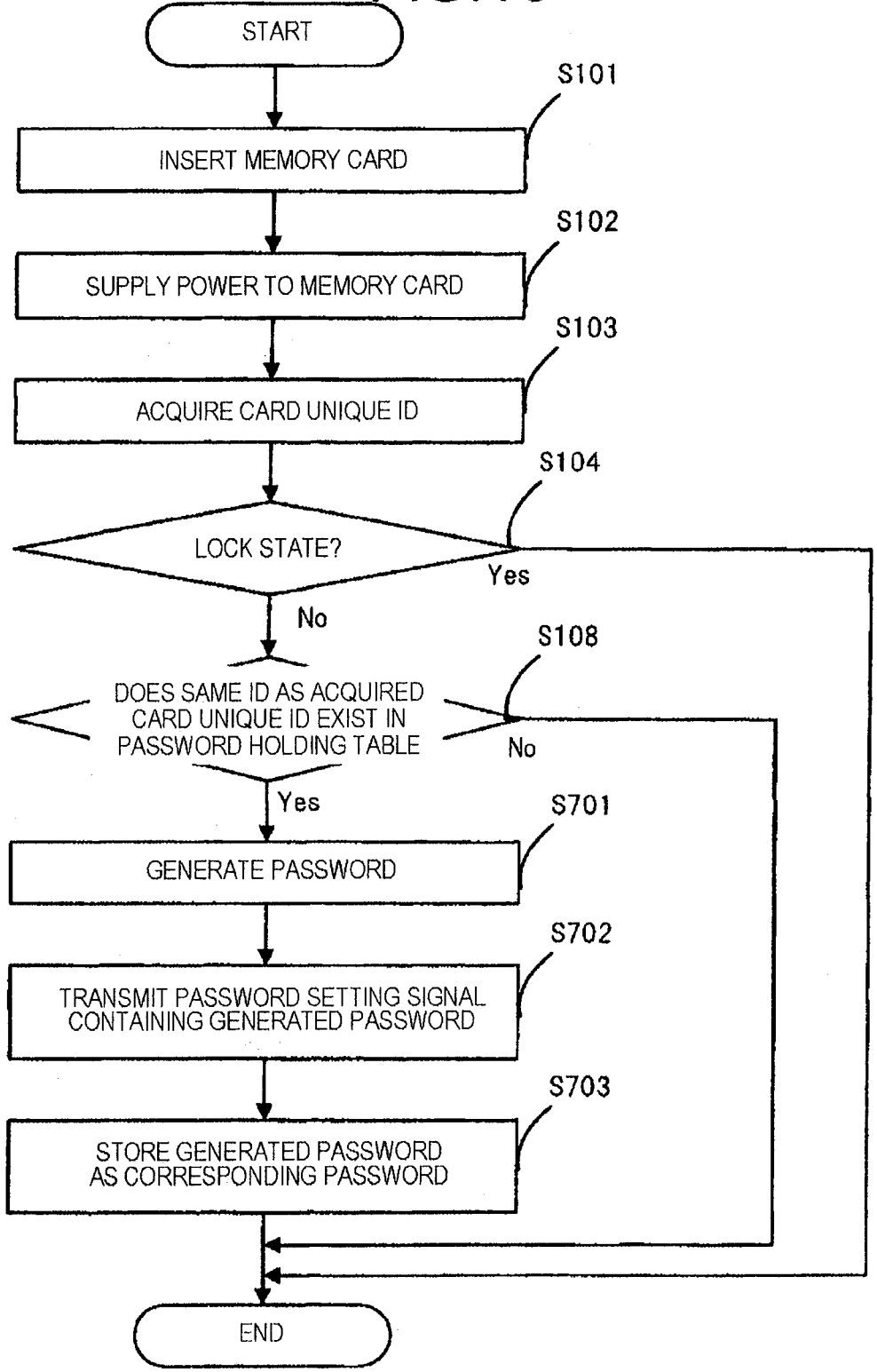
FIG. 13 is a flowchart to show a still another operation example of the electronic device in the third embodiment of the invention.

Next, still another operation example of the electronic device 100C will be described. FIG. 13 is a flowchart to show still another operation example of the electronic device 100C. Steps identical with those in FIGS. 3 and 4 are denoted by the same step numbers and will not be described again or will be briefly described.

First, the electronic device 100C performs steps S101 to S104 in FIG. 3. Steps S103 and S104 are not in particular order.

If it is determined at step S104 that the memory card 200 is not in a lock state, the electronic device 100C performs step S108 in FIG. 4. When step S104 is executed preceding step S103, if it is determined at step S104 that the memory card 200 is not in a lock state, the card unique ID is acquired.

If it is determined at step S108 that the same ID as the acquired card unique ID exists in the password holding means 101, the password generation means 111 generates a password (step S702).

Subsequently, the setting release means 105 transmits a password setting signal containing the generated password (generated password) (step S702).

Subsequently, the setting release means 105 stores the password based on the terminal personal identification number in the password holding means 101 as the password associated with the acquired card unique ID (step S602).

According to the electronic device 100C for performing the processing in FIG. 13, for example, if the memory card 200 with the password deleted by any device other than the electronic device 100C is connected to the electronic device 100C, security of the memory card 200 can be enhanced. Since the generated password is adopted as the password, it is possible to set the password with higher safety.

Figure 14:
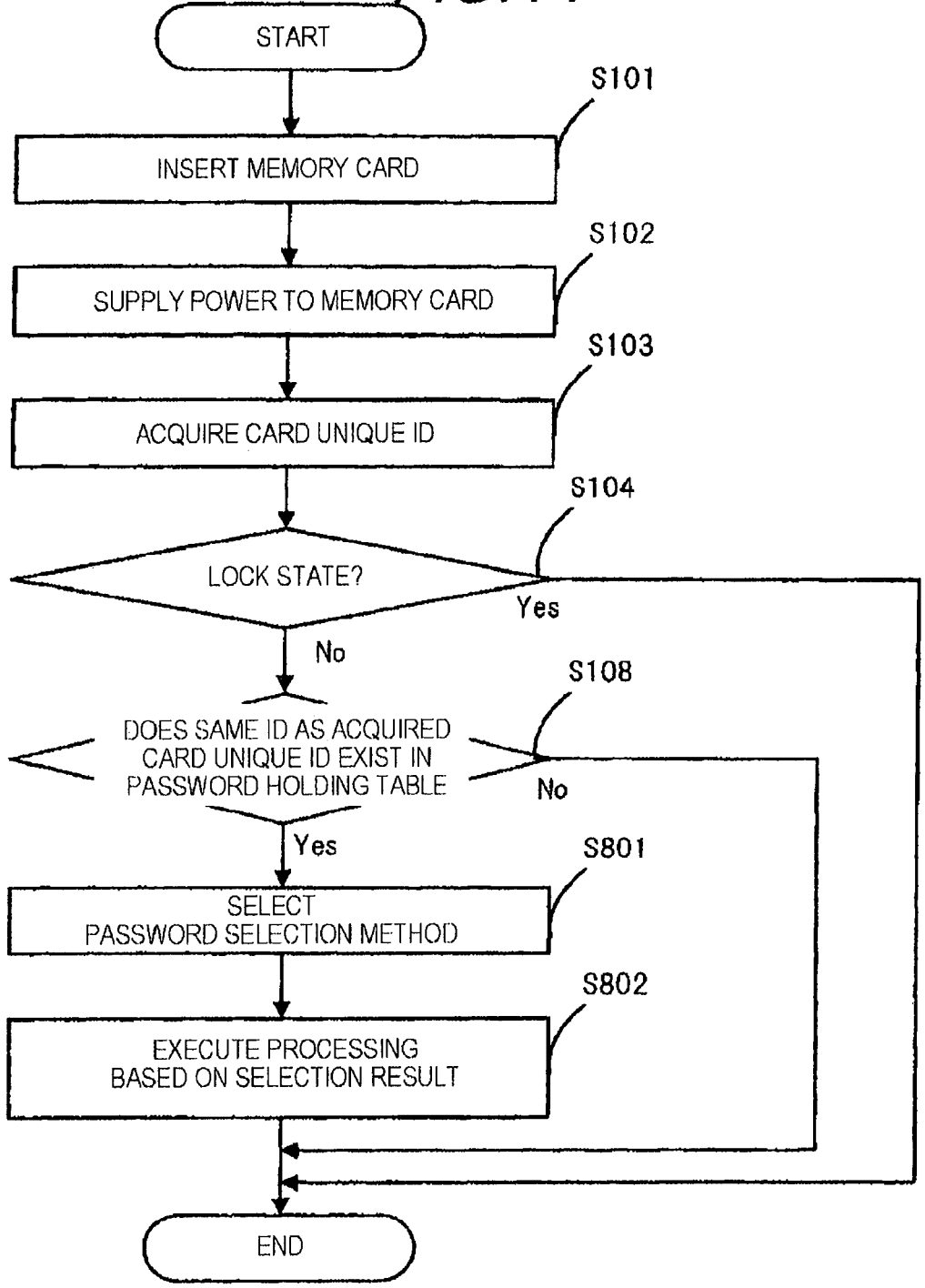
FIG. 14 is a flowchart to show a still another operation example of the electronic device in the third embodiment of the invention.

Next, still another operation example of the electronic device 100C will be described. FIG. 14 is a flowchart to show still another operation example of the electronic device 100C. Steps identical with those in FIGS. 3 and 4 are denoted by the same step numbers and will not be described again or will be briefly described.

First, the electronic device 100C performs steps S101 to S104 in FIG. 3. Steps S103 and S104 are not in particular order.

If it is determined at step S104 that the memory card 200 is not in a lock state, the electronic device 100C performs step S108 in FIG. 4. When step S104 is executed preceding step S103, if it is determined at step S104 that the memory card 200 is not in a lock state, the card unique ID is acquired.

If it is determined at step S108 that the same ID as the acquired card unique ID exists in the password holding means 101, the password setting method selection means 112 selects a setting method of a password of the memory card 200 (step S801). For example, selection is made as to which of the input password, the corresponding password, the main body password, and the generated password is used to set the password.

To perform step S801, a display section not shown in FIG. 9 displays a message to select a password setting method as shown in FIG. 23.

Subsequently, processing of transmitting a password setting signal to the memory card 200, changing the password held in the password holding means 101, etc., is performed based on the selection result of the password setting method selection means 112 (step S802). Specifically, if the input password is selected, steps S501 to S503 in FIG. 11 are performed; if the corresponding password is selected, step S401 in FIG. 10 is performed; if the main body password is selected, steps S601 and S602 in FIG. 12 are performed; and if the generated password is selected, S701 to S703 in FIG. 13 are performed.

According to the electronic device 100C for performing the processing in FIG. 14, for example, if the memory card 200 with the password deleted by any device other than the electronic device 100C is connected to the electronic device 100C, security of the memory card 200 can be enhanced. Any method desired by the user can be selected as the password setting method, so that convenience of the user is enhanced.

Fourth Embodiment

FIG. 9 shows an example of the schematic configuration of an electronic device 100D and a memory card 200 in a fourth embodiment of the invention. Components of the electronic device 100D and the memory card 200 identical with those of the electronic device 100 and the memory card 200 shown in FIG. 1 are denoted by the same reference numerals and will not be described again or will be briefly described.

The electronic device 100D has password holding selection means 113, selection information holding means 114, and password holding display means 115 in addition to the components of the electronic device 100.

To add, change, delete, etc., a password in password holding means 101, the password holding selection means 113 selects permission or no permission of data held in the password holding means 101. The password holding selection means 113 can make this connection based on selection information held in the selection information holding means 114. The password holding selection means 113 has a function as "selection section" for selecting holding or no holding in the password holding means 101.

The selection information holding means 114 holds selection information indicating whether or not a password associated with card unique ID is held for each card unique ID of the memory card 200. As selection information, for example, a flag having information indicating holding and information indicating no holding is possible. Therefore, the selection information holding means 114 holds the card unique ID and a flag indicating whether or not the password (input password) input as the password (corresponding password) corresponding to the card unique ID is held in the password holding means 101 in association with each other (in a pair), for example.

The password holding display means 115 produces various types of display. For example, the password holding display means 115 displays information indicating whether or not a password, etc., is stored in the password holding means 101 by the setting release means 105. The password holding display means 115 also displays information to select holding or no holding of a password, etc., in the password holding means 101.

Figure 16:
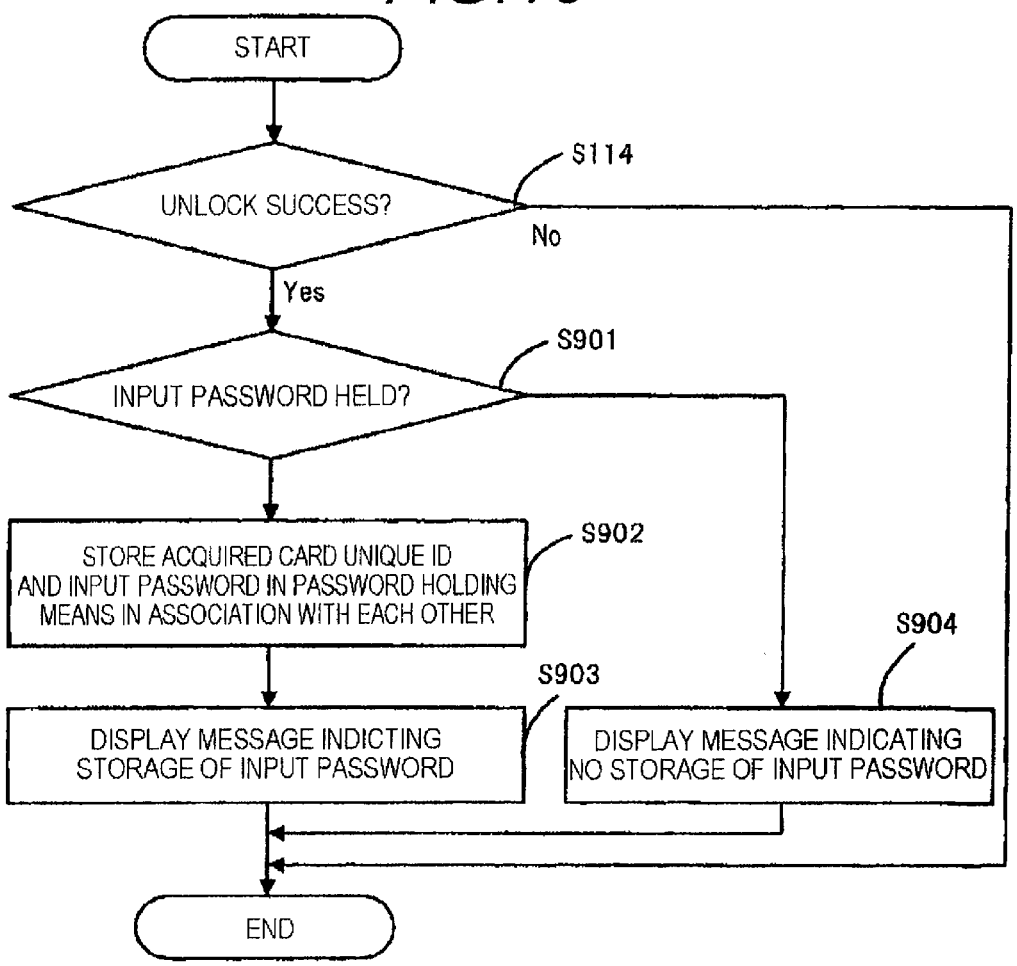
FIG. 16 is a flowchart to show an operation example of the electronic device in the fourth embodiment of the invention.

Next, an operation example of the electronic device 100D will be described. FIG. 16 is a flowchart to show an operation example of the electronic device 100D.

The processing in FIG. 16 basically is similar to the processing in FIGS. 3 and 4; however, they differ in processing after step S114. Here, steps S101 to S113 are not shown in the figure and will not be described again and only the processing on and after step S114 is shown in the figure and will be described.

If unlock ends in success at step S114, the password holding selection means 113 selects holding or no holding of the input password (input password) in the password holding means 101 (step S901).

Figure 15:
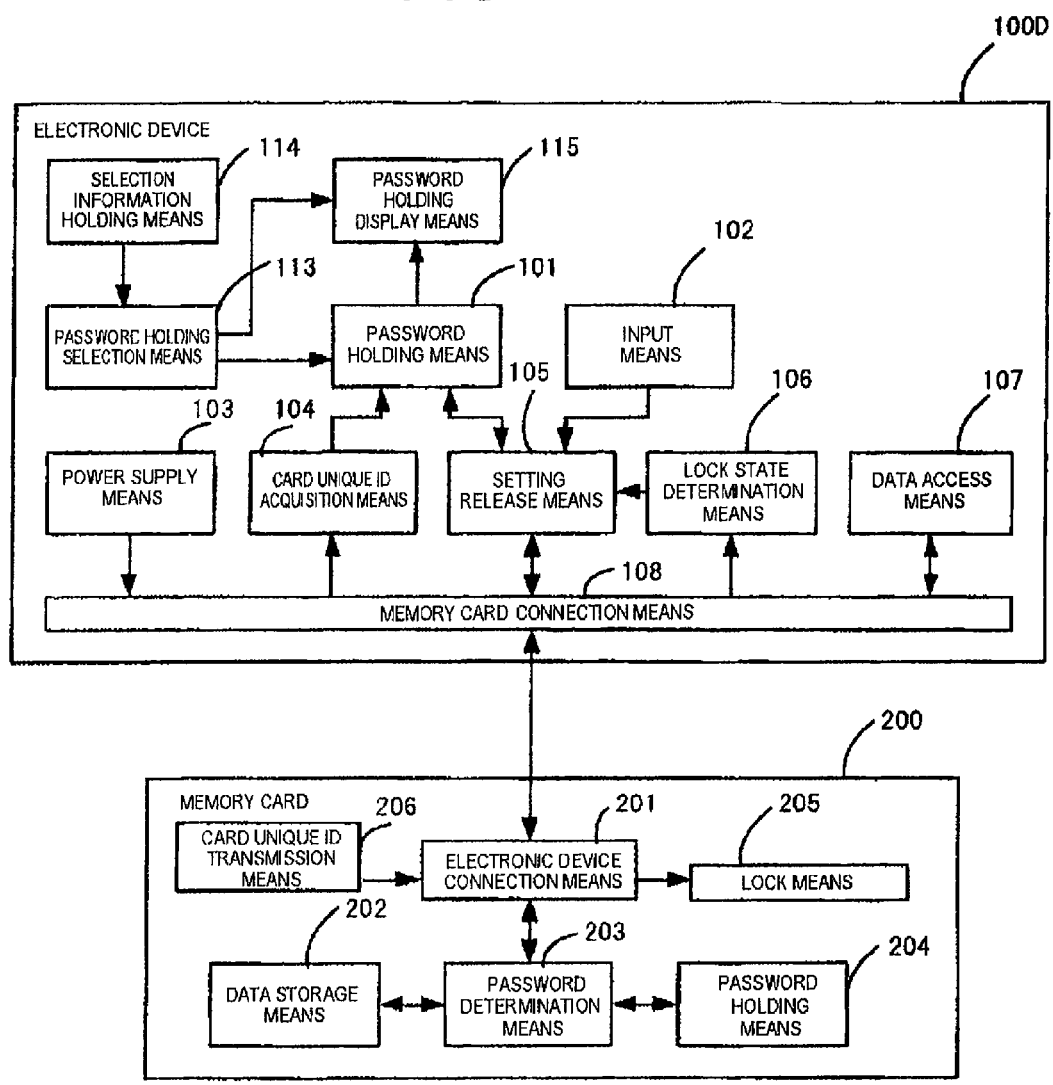
FIG. 15 shows an example of the schematic configuration of an electronic device in a fourth embodiment of the invention.

To perform step S901, the password holding display means 115 shown in FIG. 15 displays a message for checking whether or not to hold the password as shown in FIG. 24, for example.

If holding of the input password is selected, the setting release means 105 stores the acquired card unique ID and the input password in the password holding means 101 in association with each other (in a pair) (step S902).

Subsequently, the password holding display means 115 displays a message indicting storage of the input password in the password holding means 101 (step S903).

On the other hand, if no holding of the input password is selected at step S901, the password holding display means 115 displays a message indicating no storage of the input password in the password holding means 101 (step S904).

To perform step S903, the password holding display means 115 shown in FIG. 15 displays a message indicating holding of the password as shown in FIG. 25, for example. To perform step S202 in FIG. 7 or step S303 in FIG. 8, display as in FIG. 25 can also be produced.

The display processing at steps S903 and S904 can be skipped.

According to the electronic device 100D for performing the processing in FIG. 16, when the password is input, holding or no holding of the input password in the password holding means 101 can be selected and the memory resources can be utilized effectively.

Although not shown in the figure, password input at step S112 may be executed without performing the first unlock determination processing at steps S108 to S111 in FIG. 4.

Figure 17:
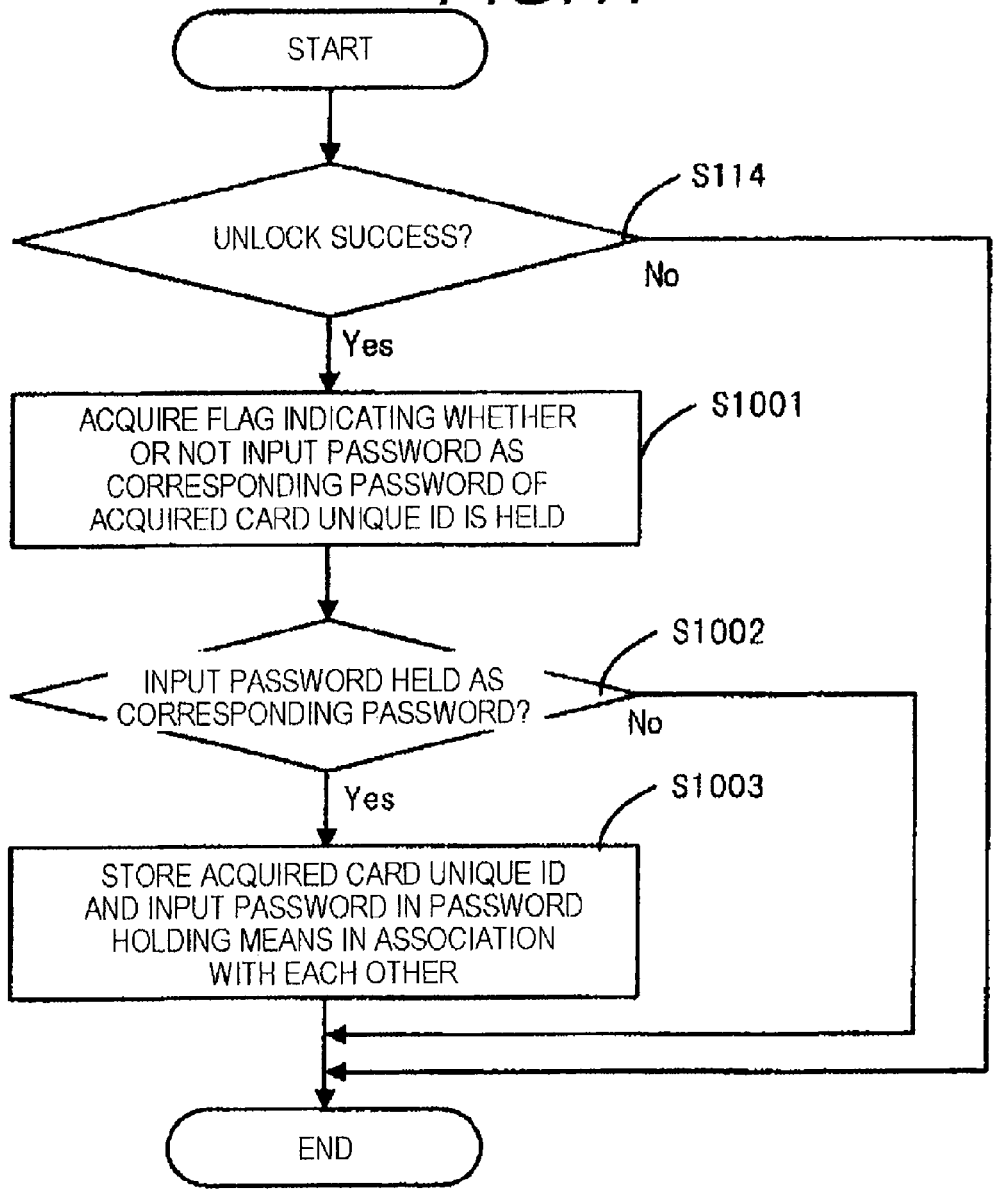
FIG. 17 is a flowchart to show another operation example of the electronic device in the fourth embodiment of the invention.

Next, another operation example of the electronic device 100D will be described. FIG. 17 is a flowchart to show another operation example of the electronic device 100D.

The processing in FIG. 17 basically is similar to the processing in FIGS. 3 and 4; however, they differ in processing after step S114. Here, steps S101 to S113 are not shown in the figure and will not be described again and only the processing on and after step S114 is shown in the figure and will be described.

If unlock ends in success at step S114, the password holding selection means 113 acquires the flag indicating whether or not the input password (input password) as the password (corresponding password) corresponding to the acquired card unique ID is held in the password holding means 101 from the selection information holding means 114 (step S1001).

Subsequently, the password holding selection means 113 selects holding or no holding of the input password in the password holding means 101 as the corresponding password based on the acquired flag (step S1002).

If holding of the input password is selected, the setting release means 105 stores the acquired card unique ID and the input password in the password holding means 101 in association with each other (in a pair) (step S1003).

According to the electronic device 100D for performing the processing in FIG. 17, when a password is input, holding or no holding of the input password in the password holding means 101 can be selected for each card unique ID and the memory resources can be utilized effectively.

A message to inform the user that the input password is held can also be displayed (step S903, S904 in FIG. 16).

Although not shown in the figure, password input at step S112 may be executed without performing the first unlock determination processing at steps S108 to S111 in FIG. 4.

Fifth Embodiment

Figure 18:
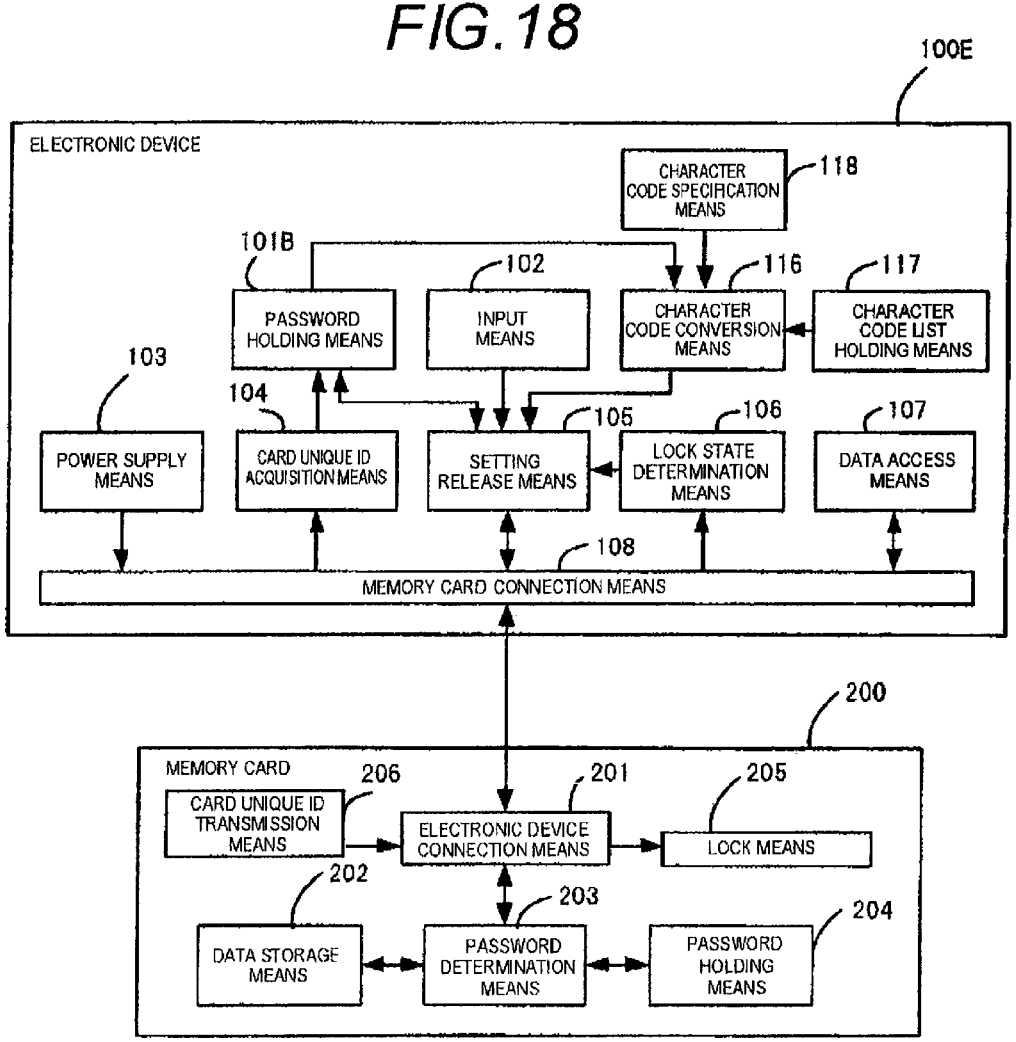
FIG. 18 shows an example of the schematic configuration of an electronic device in a fifth embodiment of the invention.

FIG. 18 shows an example of the schematic configuration of an electronic device 100E and a memory card 200 in a fifth embodiment of the invention. Components of the electronic device 100E and the memory card 200 identical with those of the electronic device and the memory card 200 shown in FIG. 1 are denoted by the same reference numerals and will not be described again or will be briefly described.

The electronic device 100E has character code conversion means 116, character code list holding means 117, character code specification means 118 in addition to the components of the electronic device 100. The electronic device 100E has password holding means 101B in place of password holding means 101.

The password holding means 101B holds character code in association with card unique ID and password in association with each other (in a pair) in addition information contained in the password holding means 101. For example, the password holding means 101B holds a password holding table 101b. FIG. 19 shows an example of the password holding table 101b. A plurality of character codes may be held in association with one password. Character code can also be previously held in the password holding means 101B, new character code can also be stored, and already held character code can also be changed.

The character code conversion means 116 converts character code of character information of a password, etc. The character code conversion means 116 can store character code in a character code list used for conversion.

The character code list holding means 117 holds various character codes of ASCII, UNICODE, S-JIS, etc., as a list.

The character code specification means 118 specifies character code of character information of a password, etc. To specify character code, for example, predetermined character code may be specified or character code input by the input means may be specified.

In the memory card 200 in the fifth embodiment, password holding means 204 holds a password and character code of the password. Even if the password held in the password holding means 204 and the password contained in an unlock signal from the electronic device 100E are identical, if the character code of the password held in the password holding means 204 and the character code of the password contained in the unlock signal do not match, lock means 205 does not unlock. The password and the character code of the password held in the password holding means 204 and the password and the character code of the password contained in the unlock signal match, the lock means 205 unlocks.

Figure 20:
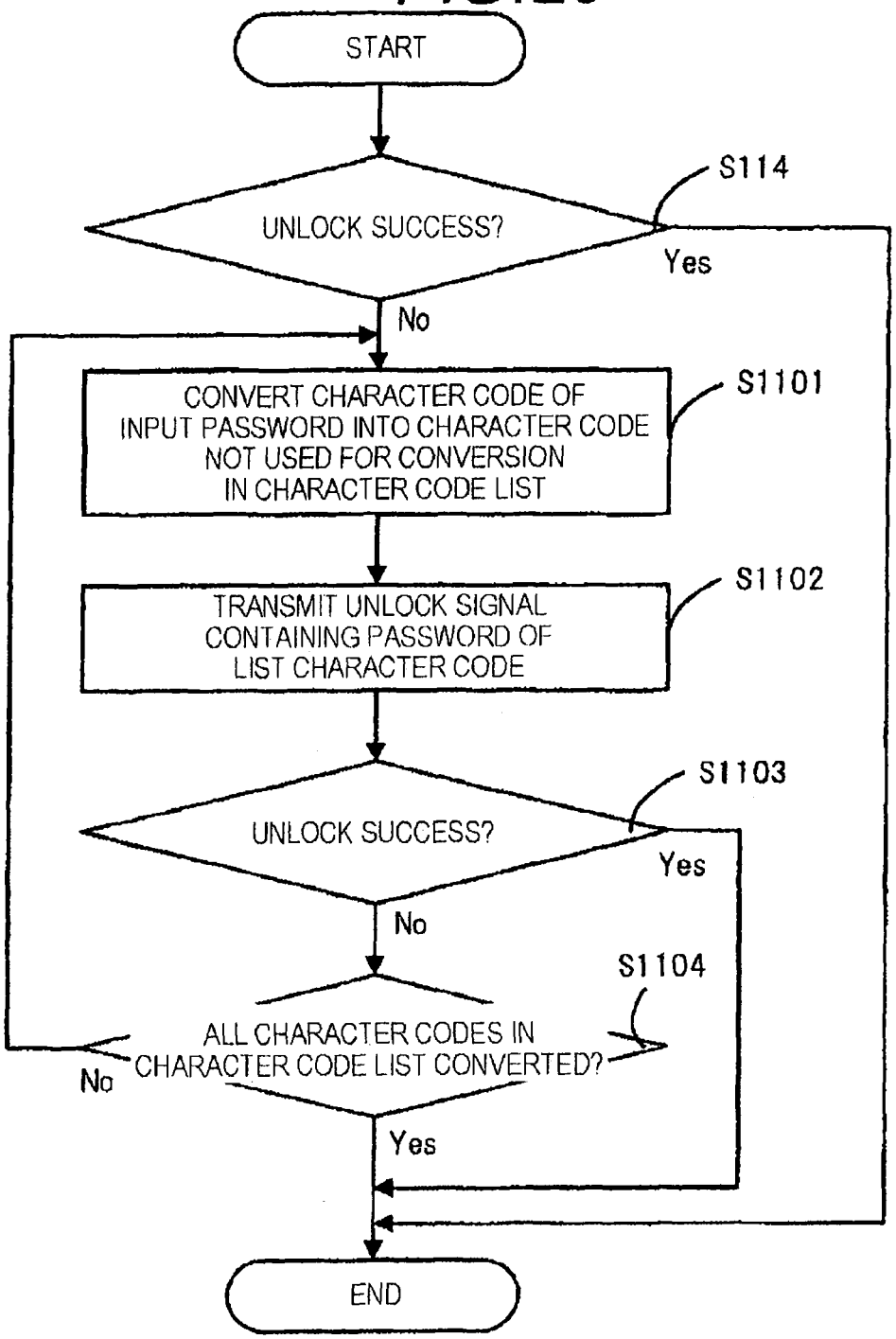
FIG. 20 is a flowchart to show an operation example of the electronic device in the fifth embodiment of the invention.

Next, an operation example of the electronic device 100E will be described. FIG. 20 is a flowchart to show an operation example of the electronic device 100E.

The processing in FIG. 20 basically is similar to the processing in FIGS. 3 and 4; however, they differ in processing after step S114. Here, steps S101 to S113 are not shown in the figure and will not be described again and only the processing on and after step S114 is shown in the figure and will be described.

If unlock ends in failure at step S114, the character code conversion means 116 references the character code list held in the character code list holding means 117 converts the character code of the input password (input password) into character code not used for conversion (step S1101).

Subsequently, setting release means 105 transmits an unlock signal containing the password of the character code converted in the character code list (list character code) (step S1102).

Subsequently, lock state determination means 106 determines whether or not unlock ends in success (step S1103).

If unlock ends in failure, the character code conversion means 116 determines whether all character codes held in the character code list are converted (step S1104). If it is determined that character code not subjected to conversion remains, the process returns to step S1101.

According to the electronic device 100E for performing the processing in FIG. 20, unless the character codes of the passwords as well as the passwords match, lock of the memory card 200 with the password is not released, safety furthermore improves. If the character code is changed in a different electronic device, unlock is possible. A search is made for the character code in the character code list in order and an unlock signal is generated and thus unlock can be performed automatically and easily.

Although not shown in the figure, password input at step S112 may be executed without performing the first unlock determination processing at steps S108 to S111 in FIG. 4.

Figure 21:
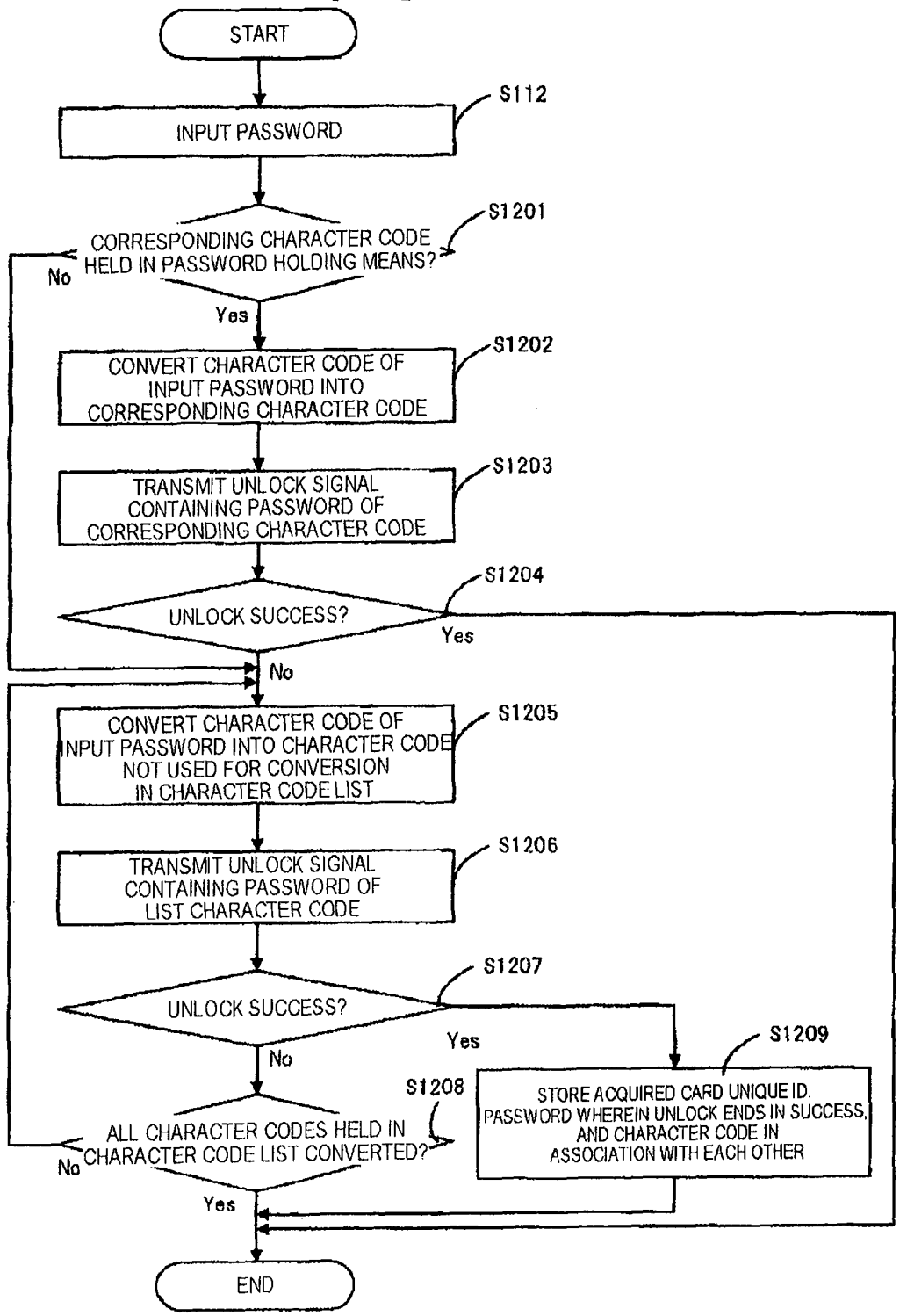
FIG. 21 is a flowchart to show another operation example of the electronic device in the fifth embodiment of the invention.

Next, another operation example of the electronic device 100E will be described. FIG. 21 is a flowchart to show another operation example of the electronic device 100E.

The processing in FIG. 21 basically is similar to the processing in FIGS. 3 and 4; however, they differ in processing after step S112. Here, steps S101 to S111 are not shown in the figure and will not be described again and only the processing on and after step S112 is shown in the figure and will be described.

After the password is input at step S112, the character code conversion means 116 checks whether or not the character code (corresponding character code) of the password corresponding to the acquired card unique ID is held in the password holding means 101B (step S1201).

If the corresponding character code is held in the password holding means 101B, the character code conversion means 116 converts the character code of the input password (input password) into the corresponding character code (step S1202).

Subsequently, the setting release means 105 transmits an unlock signal containing the password of the character code converted into the corresponding character code (step S1203).

Subsequently, the lock state determination means 106 determines whether or not unlock ends in success (step S1204).

If unlock ends in failure or the corresponding character code is not held in the password holding means 101B at step S1201, the character code conversion means 116 references the character code list held in the character code list holding means 117 and converts the character code of the input password (input password) into character code not used for conversion (step S1205).

Subsequently, the setting release means 105 transmits an unlock signal containing the password of the character code converted in the character code list (list character code) (step S1206).

Subsequently, the lock state determination means 106 determines whether or not unlock ends in success (step S1207).

If unlock ends in failure, the character code conversion means 116 determines whether all character codes held in the character code list are converted (step S1208). If it is determined that character code not subjected to conversion remains, the process returns to step S1205.

If unlock ends in success, the setting release means 105 stores the card unique ID, the password wherein unlock ends in success, and the character code of the password wherein unlock ends in success in the password holding means 101B in association with each other (step S1209). If the corresponding character code is already held, the character code of the password wherein unlock ends in success is updated as the corresponding character code.

According to the electronic device 100E for performing the processing in FIG. 21, unless the character codes of the passwords as well as the passwords match, lock of the memory card 200 with the password is not released, safety furthermore improves. If the character code is changed in a different electronic device, unlock is possible. The character code of the password can be held in the electronic device 100E in association with the password, so that efficient unlock can be performed. For example, if the corresponding character code of the corresponding password is changed by a different electronic device, a search is made for the character code in the character code list in order and an unlock signal is generated and thus unlock can be performed automatically and easily. Further, if unlock ends in success in any other character code than the character code held in the password holding means 101B, the password wherein unlock ends in success is held, whereby later the password holding means is referenced and efficient unlock can be performed.

Although not shown in the figure, password input at step S112 may be executed without performing the first unlock determination processing at steps S108 to S111 in FIG. 4.

Figure 22:
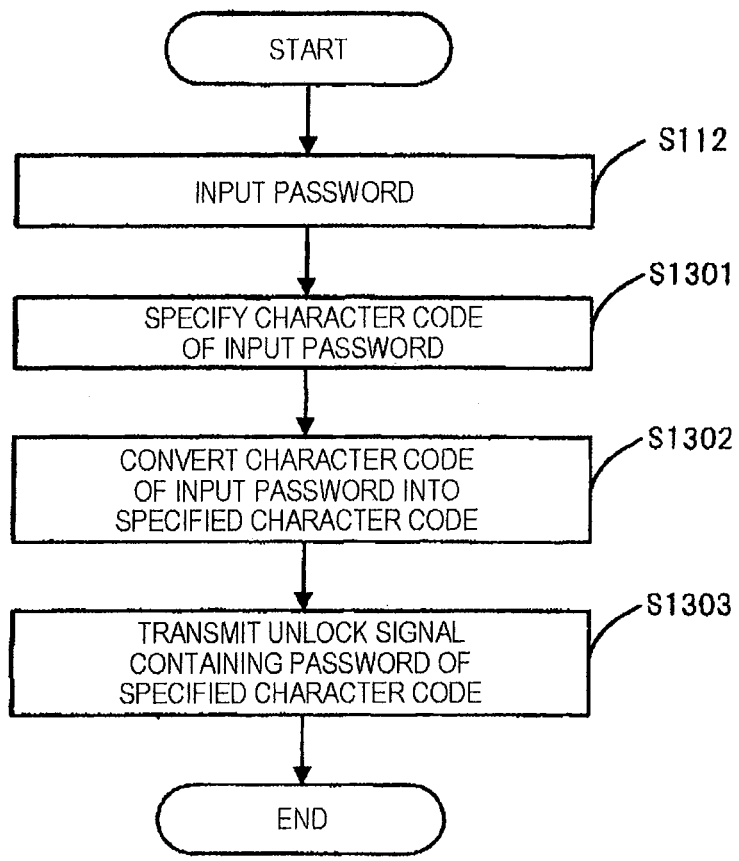
FIG. 22 is a flowchart to show still another operation example of the electronic device in the fifth embodiment of the invention.

Next, still another operation example of the electronic device 100E will be described. FIG. 22 is a flowchart to show still another operation example of the electronic device 100E.

The processing in FIG. 22 basically is similar to the processing in FIGS. 3 and 4; however, they differ in processing after step S112. Here, steps S101 to S111 are not shown in the figure and will not be described again and only the processing on and after step S112 is shown in the figure and will be described.

After the password is input at step S112, the character code specification means 118 specifies the character code of the input password (input password) (step S1301).

To perform step S1301, display means not shown in FIG. 18 displays a message for specifying character code as in FIG. 27, for example.

Subsequently, the character code conversion means 116 converts the character code of the input password into specified character code (specified character code) (step S1302).

Subsequently, the setting release means 105 transmits an unlock signal containing the password of the specified character code (step S1303).

According to the electronic device 100E for performing the processing in FIG. 22, unless the character codes of the passwords as well as the passwords match, lock of the memory card 200 with the password is not released, safety furthermore improves. If the character code is changed in a different electronic device, unlock is possible. The character code of the password can be specified, so that it is made possible to unlock in a short time.

Although not shown in the figure, password input at step S112 may be executed without performing the first unlock determination processing at steps S108 to S111 in FIG. 4.

The functions of the electronic devices in the first to fifth embodiments can also be used in combination.

While the invention has been described in detail with reference to the specific embodiments, it will be obvious to those skilled in the art that various changes and modifications can be made without departing from the spirit and the scope of the invention.

This application is based on Japanese Patent Application No. 2008-55374 filed on Mar. 5, 2008, which is incorporated herein by reference.

INDUSTRIAL APPLICABILITY

The invention is useful for an electronic device, a program, etc., capable of automatically unlocking with a password an external storage device without addition a function to the external storage device.

The invention claimed is:

1. An electronic device, comprising:
    an external storage device connection section for connecting an external storage device that can be locked with a password;
    a password holding section that holds an identification number and a password of one or more external storage devices;
    an identification number acquisition section that is adapted to acquire connection identification information indicating the connection identification number of an external storage device connected to the external storage device connection section;
    a setting release section that is adapted to determine whether or not the connection identification number is contained in the password holding section;
    a lock state determination section that is adapted, when the connection identification number is contained in the password holding section, to determine whether or not the password of the connected external storage device matches a corresponding password indicating a password corresponding to the connection identification number held in the password holding section; and
    a password change section that is adapted to change at least the corresponding password held in the password holding section if the password of the connected external storm device does not match the corresponding password in the determination result.

2. The electronic device as claimed in claim 1, wherein the password of the connected external storage device not matching a corresponding password indicating a password corresponding to the connection identification number held in the password holding section indicative of the password of the connected external storage device being unset.

3. The electronic device as claimed in claim 1, wherein the password of the connected external storage device not matching a corresponding password indicating a password corresponding to the connection identification number held in the password holding section is indicative of the password set in the connected external storage device being different from the corresponding password held in the password holding section.

4. The electronic device as claimed in claim 3, wherein change of the corresponding password is deletion of the connection identification information and the corresponding password stored in the password holding section.

5. The electronic device as claimed in claim 2, wherein change of the corresponding password is transmission of a password setting signal for setting an input password input by an input section to the connection external storage device.

6. The electronic device as claimed in claim 3, wherein the lock state determination section is adapted to determine whether or not the connected external storage device is in a lock state, wherein if the lock state determination section determines that the connected external storage device is in an unlock state and if the connection identification information is contained in the password holding section, the password change section changes the connection identification information and the corresponding password stored in the password holding section.

7. The electronic device as claimed in claim 3, wherein the lock state determination section is adapted to determine whether or not the connected external storage device is in a lock state, wherein if the lock state determination section determines that the connected external storage device is in the lock state and if the connection identification information is contained in the password holding section, the password change section changes the connection identification information and the corresponding password stored in the password holding section.

8. The electronic device as claimed in claim 6, further comprising a password setting section that is adapted to transmit a password setting signal for setting the corresponding password to the connected external storage device if the lock state determination section determines that the connected external storage device is in the unlock state and if the connection identification information is contained in the password holding section.

9. The electronic device as claimed in claim 6, further comprising a password setting section that is adapted to transmit a password setting signal for setting an input password input by an input section to the connected external storage device if the lock state determination section determines that the connected external storage device is in the unlock state and if the connection identification information is contained in the password holding section.

10. The electronic device as claimed in claim 9, wherein the password setting section stores the input password in the password holding section as the corresponding password.

11. The electronic device as claimed in claim 6, further comprising:

a password generation section for generating the password of the external storage device;

a password selection section that is adapted to select any password of an input password input by an input section, a main body password to lock the function of the electronic device, the corresponding password, or a generated password generated by the password generation section, if the lock state determination section determines that the connected external storage device is in the unlock state and if the connection identification information is contained in the password holding section; and a password setting section that is adapted to transmit a password setting signal for setting the password selected by the password selection section.

12. The electronic device as claimed in claim 7, further comprising:

an unlock section that is adapted to transmit an unlock signal for releasing the lock state of the connected external storage device based on an input password input by an input section if the lock state determination section determines that the connected external storage device is in the lock state and if the connection identification information is contained in the password holding section; and a password setting section that, if unlock ends in success after the unlock signal is transmitted, is adapted to store a success password indicating the input password corresponding to the unlock signal which has succeeded in the unlock in the password holding section as the corresponding password.

13. The electronic device as claimed in claim 7, further comprising an unlock section that is adapted to transmit an unlock signal for releasing the lock state of the connected external storage device based on an input password input by an input section if the lock state determination section determines that the connected external storage device is in the lock state and if the connection identification information is contained in the password holding section, wherein if unlock ends in failure after the unlock signal is transmitted, the password change section deletes the connection identification information and the corresponding password stored in the password holding section.

14. The electronic device as claimed in claim 7, further comprising:

an unlock section that is adapted to transmit unlock signals in order, each signal for releasing the lock state of the connected external storage device based on the passwords held in the password holding section if the lock state determination section determines that the connected external storage device is in the lock state and if the connection identification information is contained in the password holding section; and a password setting section that, if unlock ends in success after the unlock signal is transmitted, is adapted to store a success password indicating the input password corresponding to the unlock signal which has succeeded in the unlock in the password holding section as the corresponding password.

15. The electronic device as claimed in claim 7, further comprising an unlock section that is adapted to transmit unlock signals in order, each signal for releasing the lock state of the connected external storage device based on the passwords held in the password holding section if the lock state determination section determines that the connected external storage device is in the lock state and if the connection identification information is contained in the password holding section, wherein if unlock ends in failure after the unlock signals are transmitted, the password change section deletes the connection identification information and the corresponding password stored in the password holding section.

16. The electronic device as claimed in claim 1, further comprising
a selection section for selecting deletion or no deletion of the connection identification information and the corresponding password stored in the password holding section, wherein
the password change section deletes the connection identification information and the corresponding password based on a selection result of the selection section.

17. The electronic device as claimed in claim 12 further comprising
a selection section for selecting storage or no storage of the success password in the password holding section as the corresponding password, wherein
the password setting section stores the success password in the password holding section as the corresponding password based on a selection result of the selection section.

18. The electronic device as claimed in claim 17, wherein the selection section selects storage or no storage of the success password in the password holding section as the corresponding password for each piece of identification information of the external storage device held in the password holding section.

19. The electronic device as claimed in claim 10, wherein if the password is held in the password holding section as the corresponding password, the password setting section displays a message indicating the fact on the display section.

20. The electronic device as claimed in claim 7, further comprising:
a character code conversion section for converting a character code; and
an unlock section which is adapted to transmit an unlock signal for releasing the lock state of the connected external storage device based on the corresponding password of the character code converted by the character code conversion section if the lock state determination section determines that the connected external storage device is in the lock state and if the connection identification information is contained in the password holding section.

21. The electronic device as claimed in claim 20, further comprising:
a password setting section that, if unlock ends in success after the unlock signal is transmitted, is adapted to store the password corresponding to the unlock signal which has succeeded in the unlock and store the character code of the password in the password holding section in association with the connection identification information.

22. The electronic device as claimed in claim 20, wherein if the character code of the password corresponding to the connection identification information is held in the password holding section, the unlock section transmits the unlock signal based on the corresponding password of the character code.

23. The electronic device as claimed in claim 20, further comprising
a character code specification section for specifying a character code, wherein
the character code conversion section converts into character code specified by the character code specification section, and
the unlock section transmits the unlock signal based on the corresponding password of the character code provided by the character code conversion section.

24. The electronic device as claimed in claim 20, further comprising
a character code list holding section that holds information of a plurality of character codes, wherein
the unlock section transmits the unlock signals in order based on input passwords input by an input section, of the character codes held in the character code list holding section.

* * * * *